United States Patent
Fukumori et al.

(10) Patent No.: US 11,465,710 B2
(45) Date of Patent: Oct. 11, 2022

(54) BICYCLE REAR SPROCKET ASSEMBLY

(71) Applicant: SHIMANO INC., Sakai (JP)

(72) Inventors: Tsuyoshi Fukumori, Sakai (JP); Tomonari Oka, Sakai (JP)

(73) Assignee: SHIMANO INC., Sakai (JP)

( * ) Notice: Subject to any disclaimer, the term of this patent is extended or adjusted under 35 U.S.C. 154(b) by 415 days.

(21) Appl. No.: 16/709,876

(22) Filed: Dec. 10, 2019

(65) Prior Publication Data
US 2021/0171155 A1    Jun. 10, 2021

(51) Int. Cl.
*B62M 9/10* (2006.01)
(52) U.S. Cl.
CPC ................... *B62M 9/10* (2013.01)
(58) Field of Classification Search
CPC ....................................................... B62M 9/10
USPC .......................................................... 474/160
See application file for complete search history.

(56) References Cited

U.S. PATENT DOCUMENTS

| 2006/0058140 A1* | 3/2006 | Nakano | B62M 9/10 474/152 |
| 2010/0099530 A1* | 4/2010 | Chiang | B62M 9/10 474/160 |

FOREIGN PATENT DOCUMENTS

| DE | 102018111277 A1 * | 12/2018 | ......... B60B 27/0052 |
| EP | 1342657 A2 * | 9/2003 | ............. B62M 9/10 |
| EP | 1439117 A2 * | 7/2004 | ........... B60B 27/026 |

* cited by examiner

*Primary Examiner* — Michael McCullough
*Assistant Examiner* — Emily Rose Kincaid
(74) *Attorney, Agent, or Firm* — Mori & Ward, LLP

(57) ABSTRACT

A bicycle rear sprocket assembly comprises a first sprocket and a second sprocket. The first sprocket includes a first torque-transmitting profile disposed around a first sprocket opening. The second sprocket includes a second torque-transmitting profile disposed around a second sprocket opening. The first torque-transmitting profile is configured to engage with the second torque-transmitting profile in the mounted state. The first sprocket includes an axial abutment surface configured to axially abut against the second sprocket for axially positioning the first sprocket and the second sprocket relative to each other in the mounted state. The axial abutment surface is disposed farther from an axial center plane of the bicycle rear hub assembly than the first torque-transmitting profile in the mounted state.

25 Claims, 17 Drawing Sheets

BICYCLE REAR SPROCKET ASSEMBLY

BACKGROUND OF THE INVENTION

Field of the Invention

The present invention relates to a bicycle rear sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket assembly. Recently, a bicycle rear sprocket assembly having a wide gear range has been becoming popular. For example, in the mountain bike market, a bicycle drive train comprising a single front sprocket, i.e. no front derailleur, and a wide range rear sprocket assembly has become popular for bicycle riders because omitting a front derailleur leads to weight saving for a bicycle. Further, such a single front sprocket system provides a simple shifting operation to bicycle riders since they can concentrate on a shifting operation of a rear derailleur during ride. If such a single front sprocket is adopted for a bicycle drive train in order to enjoy a light-weight and a simple shifting operation, a total gear range then tends to be insufficient due to a single front sprocket. However, it is not easy to simply increase the total number of rear sprockets for obtaining a wider gear range in spite of a single front sprocket because an axial space for disposing a rear sprocket assembly is limited due to a reason why the rear sprocket assembly has to be disposed between a bicycle rear wheel and a right drop end of a bicycle frame. Therefore, there is need for a rear-sprocket mounting structure in which more rear sprockets can be mounted on a rear hub assembly and/or a total gear range of a rear sprocket assembly can be increased.

SUMMARY OF THE INVENTION

In accordance with a first aspect of the present invention, a bicycle rear sprocket assembly is configured to be mounted to a sprocket support body of a bicycle rear hub assembly. The bicycle rear sprocket assembly comprises a first sprocket and a second sprocket. The first sprocket has a first sprocket opening, a first hub-center facing side and a first hub-center far side provided on a reverse side of the first hub-center facing side in an axial direction with respect to a rotational center axis of the bicycle rear sprocket assembly. The first hub-center facing side is configured to face toward an axial center plane of the bicycle rear hub assembly in a mounted state where the bicycle rear sprocket assembly is mounted to the bicycle rear hub assembly. The first sprocket includes a first torque-transmitting profile disposed around the first sprocket opening. The second sprocket has a second sprocket opening, a second hub-center facing side and a second hub-center far side provided on a reverse side of the second hub-center facing side in the axial direction. The second hub-center facing side is configured to face toward the axial center plane of the bicycle rear hub assembly in the mounted state. The second sprocket includes a second torque-transmitting profile disposed around the second sprocket opening. The second sprocket is configured to be disposed closer to the axial center plane of the bicycle rear hub assembly than the first sprocket in the mounted state. The first torque-transmitting profile of the first sprocket is configured to engage with the second torque-transmitting profile of the second sprocket in the mounted state. The first sprocket includes an axial abutment surface configured to axially abut against the second sprocket for axially positioning the first sprocket and the second sprocket relative to each other in the mounted state. The axial abutment surface is disposed farther from the axial center plane of the bicycle rear hub assembly than the first torque-transmitting profile in the mounted state.

With the bicycle rear sprocket assembly according to the first aspect, the engagement between the first torque-transmitting profile and the second torque-transmitting profile can transmit a rotational force between the first sprocket and the second sprocket without engagement between the first torque-transmitting profile and the sprocket support body. Furthermore, the axial abutment surface can axially position the first sprocket relative to the second sprocket. Thus, it is possible to increase a total number of sprockets of the bicycle rear sprocket assembly without making the sprocket support body longer in the axial direction. Accordingly, it is possible to increase a gear range of the bicycle rear sprocket assembly with saving the weight of the bicycle rear hub assembly.

In accordance with a second aspect of the present invention, the bicycle rear sprocket assembly according to the first aspect is configured so that the axial abutment surface is adjacent to the first torque-transmitting profile in the axial direction.

With the bicycle rear sprocket assembly according to the second aspect, it is possible to shorten an axial width of the first sprocket, making the bicycle rear sprocket assembly smaller in the axial direction.

In accordance with a third aspect of the present invention, the bicycle rear sprocket assembly according to the first or second aspect is configured so that the axial abutment surface is disposed radially outwardly from the first torque-transmitting profile.

With the bicycle rear sprocket assembly according to the third aspect, it is possible to make a posture of the first sprocket relative to the second sprocket more stable.

In accordance with a fourth aspect of the present invention, the bicycle rear sprocket assembly according to any one of the first to third aspects is configured so that the first torque-transmitting profile includes a first axial end disposed closer to the first hub-center facing side than to the first hub-center far side in the axial direction. The second torque-transmitting profile includes a second axial end disposed closer to the second hub-center far side than to the second hub-center facing side in the axial direction.

With the bicycle rear sprocket assembly according to the fourth aspect, it is possible to improve the strength of engagement between the first torque-transmitting profile and the second torque-transmitting profile with making the total axial length of the first sprocket and the second sprocket short in the mounted state where the bicycle rear sprocket assembly is mounted to the bicycle rear hub assembly.

In accordance with a fifth aspect of the present invention, the bicycle rear sprocket assembly according to any one of the first to fourth aspects is configured so that a total tooth number of the first sprocket is smaller than a total tooth number of the second sprocket.

With the bicycle rear sprocket assembly according to the fifth aspect, it is possible to utilize the structures of the first torque-transmitting profile and the second torque-transmitting profile on a top-gear side in the bicycle rear sprocket assembly.

In accordance with a sixth aspect of the present invention, the bicycle rear sprocket assembly according to the fifth aspect is configured so that the total tooth number of the first sprocket is equal to or smaller than fourteen.

With the bicycle rear sprocket assembly according to the sixth aspect, it is possible to reliably utilize the structures of the first torque-transmitting profile and the second torque-transmitting profile on the top-gear side in the bicycle rear sprocket assembly.

In accordance with a seventh aspect of the present invention, the bicycle rear sprocket assembly according to any one of the first to sixth aspects is configured so that the first torque-transmitting profile includes a plurality of first torque-transmitting spline teeth. The second torque-transmitting profile includes a plurality of second torque-transmitting spline teeth.

With the bicycle rear sprocket assembly according to the seventh aspect, it is possible to effectively transmit the rotational force between the first sprocket and the second sprocket via the plurality of first torque-transmitting spline teeth and the plurality of second torque-transmitting spline teeth.

In accordance with an eighth aspect of the present invention, the bicycle rear sprocket assembly according to any one of the first to eighth aspects is configured so that the second torque-transmitting profile of the second sprocket is configured to engage with a hub torque-transmitting profile of the sprocket support body in the mounted state.

With the bicycle rear sprocket assembly according to the eighth aspect, it is possible to transmit the rotational force from the first sprocket to the sprocket support body of the bicycle rear sprocket assembly via the first torque-transmitting profile, the second torque-transmitting profile, and the hub torque-transmitting profile. Especially, since the second torque transmitting profile of the second sprocket engage with both of the first torque-transmitting profile of the first sprocket and a hub torque-transmitting profile of the sprocket support body, it is possible to transmit a rotational force from the first sprocket to the bicycle rear hub assembly through the second torque transmitting profile only. Thus, it is possible to improve flexibility of designing at least one of the first torque-transmitting profile, the second torque-transmitting profile, and the hub torque-transmitting profile.

In accordance with a ninth aspect of the present invention, the bicycle rear sprocket assembly according to any one of the first to eighth aspects is configured so that the second sprocket includes a third torque-transmitting profile disposed around the second sprocket opening at least on the second hub-center facing side. The third torque-transmitting profile of the second sprocket is configured to engage with a hub torque-transmitting profile of the sprocket support body in the mounted state.

With the bicycle rear sprocket assembly according to the ninth aspect, it is possible to improve strength of the second and third torque-transmitting profiles.

In accordance with a tenth aspect of the present invention, the bicycle rear sprocket assembly according to the ninth aspect is configured so that the third torque-transmitting profile is offset from the second torque-transmitting profile in a circumferential direction with respect to the rotational center axis.

With the bicycle rear sprocket assembly according to the tenth aspect, it is possible to reliably improve strength of the second and third torque-transmitting profiles.

In accordance with an eleventh aspect of the present invention, the bicycle rear sprocket assembly according to any one of the first to tenth aspects is configured so that the first sprocket is configured to be disposed axially outwardly from the sprocket support body of the bicycle rear hub assembly with respect to the rotational center axis in the mounted state.

With the bicycle rear sprocket assembly according to the eleventh aspect, it is possible to increase the gear range of the bicycle rear sprocket assembly with saving the weight of the sprocket support body of the bicycle rear hub assembly.

In accordance with a twelfth aspect of the present invention, a bicycle rear sprocket assembly is configured to be mounted to a sprocket support body of a bicycle rear hub assembly. The bicycle rear sprocket assembly comprises a first sprocket and a second sprocket. The first sprocket has a first sprocket opening, a first hub-center facing side and a first hub-center far side provided on a reverse side of the first hub-center facing side in an axial direction with respect to a rotational center axis of the bicycle rear sprocket assembly. The first hub-center facing side is configured to face toward an axial center plane of the bicycle rear hub assembly in a mounted state where the bicycle rear sprocket assembly is mounted to the bicycle rear hub assembly. The first sprocket includes a first torque-transmitting profile disposed around the first sprocket opening at least on the first hub-center facing side. The second sprocket has a second sprocket opening, a second hub-center facing side and a second hub-center far side provided on a reverse side of the second hub-center facing side in the axial direction. The second hub-center facing side is configured to face toward the axial center plane of the bicycle rear hub assembly in the mounted state. The second sprocket includes a second torque-transmitting profile disposed around the second sprocket opening so that the second torque-transmitting profile extends at least between the second hub-center facing side and the second hub-center far side. The second sprocket is configured to be disposed closer to the axial center plane of the bicycle rear hub assembly than the first sprocket in the mounted state. The second torque-transmitting profile of the second sprocket is configured to engage with the first torque-transmitting profile of the first sprocket and a hub torque-transmitting profile of the sprocket support body in the mounted state. The twelfth aspect of the present invention can be combined with any of the first to eleventh aspects of the present invention.

With the bicycle rear sprocket assembly according to the twelfth aspect, it is possible to transmit a rotational force from the first sprocket to the sprocket support body of the bicycle rear sprocket assembly via the first torque-transmitting profile, the second torque-transmitting profile, and the hub torque-transmitting profile. Especially, since the second torque transmitting profile of the second sprocket engage with both of the first torque-transmitting profile of the first sprocket and a hub torque-transmitting profile of the sprocket support body, it is possible to transmit a rotational force from the first sprocket to the bicycle rear hub assembly through the second torque transmitting profile only. Thus, it is possible to improve flexibility of designing at least one of the first torque-transmitting profile, the second torque-transmitting profile, and the hub torque-transmitting profile. This can facilitate increasing a gear range of the bicycle rear sprocket assembly.

In accordance with a thirteenth aspect of the present invention, the bicycle rear sprocket assembly according to the twelfth aspect is configured so that the second torque-transmitting profile of the second sprocket is configured to engage with the first torque-transmitting profile of the first sprocket on the second hub-center far side in the mounted state and configured to engage with a hub torque-transmitting profile of the sprocket support body on the second hub-center facing side in the mounted state.

With the bicycle rear sprocket assembly according to the thirteenth aspect, it is possible to reliably improve flexibility of designing at least one of the first torque-transmitting profile, the second torque-transmitting profile, and the hub torque-transmitting profile.

In accordance with a fourteenth aspect of the present invention, the bicycle rear sprocket assembly according to the twelfth or thirteenth aspect is configured so that the second torque-transmitting profile extends beyond a sprocket axial center plane of the second sprocket.

With the bicycle rear sprocket assembly according to the fourteenth aspect, it is possible to reliably improve flexibility of designing at least one of the first torque-transmitting profile, the second torque-transmitting profile, and the hub torque-transmitting profile.

In accordance with a fifteenth aspect of the present invention, the bicycle rear sprocket assembly according to any one of the twelfth to fourteenth aspects is configured so that the second torque-transmitting profile extends from the second hub-center facing side to the second hub-center far side.

With the bicycle rear sprocket assembly according to the fifteenth aspect, it is possible to improve strength of the second torque-transmitting profile and manufacturing efficiency of the second sprocket.

In accordance with a sixteenth aspect of the present invention, a bicycle rear sprocket assembly is configured to be mounted to a sprocket support body of a bicycle rear hub assembly. The bicycle rear sprocket assembly comprises a first sprocket and a second sprocket. The first sprocket has a first sprocket opening, a first hub-center facing side and a first hub-center far side provided on a reverse side of the first hub-center facing side in an axial direction with respect to a rotational center axis of the bicycle rear sprocket assembly. The first hub-center facing side is configured to face toward an axial center plane of the bicycle rear hub assembly in a mounted state where the bicycle rear sprocket assembly is mounted to the bicycle rear hub assembly. The first sprocket includes a first torque-transmitting profile disposed around the first sprocket opening at least on the first hub-center facing side. The second sprocket has a second sprocket opening, a second hub-center facing side and a second hub-center far side provided on a reverse side of the second hub-center facing side in the axial direction. The second hub-center facing side is configured to face toward the axial center plane of the bicycle rear hub assembly in the mounted state. The second sprocket includes a second torque-transmitting profile disposed around the second sprocket opening and a third torque-transmitting profile disposed around the second sprocket opening. The second sprocket is configured to be disposed closer to the axial center plane of the bicycle rear hub assembly than the first sprocket in the mounted state. The second torque-transmitting profile of the second sprocket includes at least one torque-transmitting spline tooth extending in the axial direction. The third torque-transmitting profile of the second sprocket includes at least one additional torque-transmitting spline tooth extending in the axial direction. The at least one torque-transmitting spline tooth has an axial spline length defined in the axial direction. The at least one additional torque-transmitting spline tooth has an additional axial spline length defined in the axial direction. The axial spline length of the at least one torque-transmitting spline tooth is different from the additional axial spline length of the at least one additional torque-transmitting spline tooth. The sixteenth aspect of the present invention can be combined with any of the first to fifteenth aspects of the present invention.

With the bicycle rear sprocket assembly according to the sixteenth aspect, it is possible to improve flexibility of designing at least one of the first torque-transmitting profile, the second torque-transmitting profile, and the third torque-transmitting profile. This can facilitate increasing a gear range of the bicycle rear sprocket assembly.

In accordance with a seventeenth aspect of the present invention, the bicycle rear sprocket assembly according to the sixteenth aspect is configured so that the axial spline length of the at least one torque-transmitting spline tooth is larger than the additional axial spline length of the at least one additional torque-transmitting spline tooth.

With the bicycle rear sprocket assembly according to the seventeenth aspect, it is possible to improve strength of the second torque-transmitting profile.

In accordance with an eighteenth aspect of the present invention, the bicycle rear sprocket assembly according to the seventeenth aspect is configured so that the at least one torque-transmitting spline tooth is configured to engage with the first torque-transmitting profile of the first sprocket and a hub torque-transmitting profile of the sprocket support body in the mounted state. The at least one additional torque-transmitting spline tooth is configured to be free of engagement with the first torque-transmitting profile of the first sprocket and to engage with the hub torque-transmitting profile of the sprocket support body in the mounted state.

With the bicycle rear sprocket assembly according to the eighteenth aspect, it is possible to increase a circumferential width of the first torque-transmitting profile. Thus, it is possible to improve strength of the first torque-transmitting profile in a circumferential direction of the bicycle rear sprocket assembly.

In accordance with a nineteenth aspect of the present invention, the bicycle rear sprocket assembly according to any one of the sixteenth to eighteenth aspects is configured so that the second torque-transmitting profile of the second sprocket includes a further additional torque-transmitting spline tooth that is different from the at least one torque-transmitting spline tooth and the at least one additional torque-transmitting spline tooth in at least one of size and shape.

With the bicycle rear sprocket assembly according to the nineteenth aspect, it is possible to easily mount the bicycle rear sprocket assembly to the sprocket support body of the bicycle rear hub assembly at a correct circumferential position with respect to the sprocket support body.

In accordance with a twentieth aspect of the present invention, a bicycle rear sprocket assembly is configured to be mounted to a sprocket support body of a bicycle rear hub assembly. The bicycle rear sprocket assembly comprises a first sprocket and a second sprocket. The first sprocket has a first sprocket opening, a first hub-center facing side and a first hub-center far side provided on a reverse side of the first hub-center facing side in an axial direction with respect to a rotational center axis of the bicycle rear sprocket assembly. The first hub-center facing side is configured to face toward an axial center plane of the bicycle rear hub assembly in a mounted state where the bicycle rear sprocket assembly is mounted to the bicycle rear hub assembly. The first sprocket includes a plurality of first torque-transmitting spline teeth disposed around the first sprocket opening. The second sprocket has a second sprocket opening, a second hub-center facing side and a second hub-center far side provided on a reverse side of the second hub-center facing side in the axial direction. The second hub-center facing side is configured to face toward the axial center plane of the bicycle rear hub assembly in the mounted state. The second sprocket includes a plurality of second torque-transmitting spline teeth disposed around the second sprocket opening. The second sprocket is configured to be disposed closer to the axial center plane of the bicycle rear hub assembly than the first sprocket in the mounted state. The plurality of the first torque-transmitting spline teeth of the first sprocket is configured to engage with the plurality of the second torque-transmitting spline teeth of the second sprocket in the mounted state, The plurality of the first torque-transmitting spline teeth of the first sprocket has a first internal-spline minor diameter with respect to the rotational center axis. The plurality of the second torque-transmitting spline teeth of the second sprocket has a second internal-spline minor diameter with respect to the rotational center axis. A diameter difference defined by subtracting the second internal-spline minor diameter from the first internal-spline minor diameter is equal to or larger than −2 mm. The twentieth aspect of the present invention can be combined with any of the first to nineteenth aspects of the present invention.

With the bicycle rear sprocket assembly according to the twentieth aspect, the engagement between the plurality of first torque-transmitting spline teeth and the plurality of second torque-transmitting spline teeth can transmit a rotational force between the first sprocket and the second sprocket without engagement between the first torque-transmitting profile and the sprocket support body. This can facilitate increasing a gear range of the bicycle rear sprocket assembly. Furthermore, the diameter difference allows the first sprocket to be arranged on the sprocket support body as need arises. Accordingly, it is possible to increase a gear range of the bicycle rear sprocket assembly with arranging the first sprocket on the sprocket support body.

In accordance with a twenty-first aspect of the present invention, the bicycle rear sprocket assembly according to the twentieth aspect is configured so that the diameter difference is equal to or larger than 0 mm.

With the bicycle rear sprocket assembly according to the twenty-first aspect, it is possible to reliably increase a gear range of the bicycle rear sprocket assembly with arranging the first sprocket on the sprocket support body.

In accordance with a twenty-second aspect of the present invention, the bicycle rear sprocket assembly according to the twentieth or twenty-first aspect is configured so that the first torque-transmitting profile is disposed at least on the first hub-center facing side. The second torque-transmitting profile is disposed at least on the second hub-center far side.

With the bicycle rear sprocket assembly according to the twenty-second aspect, it is possible to improve the coupling strength of the first torque-transmitting profile and the second torque-transmitting profile.

In accordance with a twenty-third aspect of the present invention, a bicycle rear sprocket assembly is configured to be mounted to a sprocket support body of a bicycle rear hub assembly. The bicycle rear sprocket assembly comprises a first sprocket and a second sprocket. The first sprocket has a first sprocket opening, a first hub-center facing side and a first hub-center far side provided on a reverse side of the first hub-center facing side in an axial direction with respect to a rotational center axis of the bicycle rear sprocket assembly. The first hub-center facing side is configured to face toward an axial center plane of the bicycle rear hub assembly in a mounted state where the bicycle rear sprocket assembly is mounted to the bicycle rear hub assembly. The first sprocket includes a plurality of first torque-transmitting spline teeth disposed around the first sprocket opening. The first sprocket is configured to be disposed axially outwardly from the sprocket support body of the bicycle rear hub assembly with respect to the rotational center axis in the mounted state. The second sprocket has a second sprocket opening, a second hub-center facing side and a second hub-center far side provided on a reverse side of the second hub-center facing side in the axial direction. The second hub-center facing side is configured to face toward the axial center plane of the bicycle rear hub assembly in the mounted state. The second sprocket includes a plurality of second torque-transmitting spline teeth disposed around the second sprocket opening. The second sprocket is configured to be disposed closer to the axial center plane of the bicycle rear hub assembly than the first sprocket in the mounted state. The plurality of the first torque-transmitting spline teeth of the first sprocket is configured to engage with the plurality of the second torque-transmitting spline teeth of the second sprocket in the mounted state. The plurality of the first torque-transmitting spline teeth of the first sprocket has a first internal-spline minor diameter with respect to the rotational center axis. The first internal-spline minor diameter is larger than an external spline minor diameter of a plurality of hub torque-transmitting spline teeth of the sprocket support body of the bicycle rear hub assembly. The twenty-third aspect of the present invention can be combined with any of the first to twenty-second aspects of the present invention.

With the bicycle rear sprocket assembly according to the twenty-third aspect, the engagement between the plurality of first torque-transmitting spline teeth and the plurality of second torque-transmitting spline teeth can transmit a rotational force between the first sprocket and the second sprocket without engagement between the first torque-transmitting profile and the sprocket support body. This can facilitate increasing a gear range of the bicycle rear sprocket assembly. Furthermore, it is possible to arrange the first sprocket on the sprocket support body as need arises. Accordingly, it is also possible to increase a gear range of the bicycle rear sprocket assembly with arranging the first sprocket on the sprocket support body.

In accordance with a twenty-fourth aspect of the present invention, the bicycle rear sprocket assembly according to the twenty-third aspect is configured so that the second sprocket is disposed on the sprocket support body of the bicycle rear hub assembly in the mounted state.

With the bicycle rear sprocket assembly according to the twenty-fourth aspect, it is possible to utilize an outer space of the sprocket support body for the second sprocket.

In accordance with a twenty-fifth aspect of the present invention, the bicycle rear sprocket assembly according to the twenty-third or twenty-fourth aspect is configured so that the plurality of the first torque-transmitting spline teeth of the first sprocket has a first internal-spline major diameter with respect to the rotational center axis. The first internal-spline major diameter is larger than an external spline major diameter of the plurality of hub torque-transmitting spline teeth of the sprocket support body of the bicycle rear hub assembly.

With the bicycle rear sprocket assembly according to the twenty-fifth aspect, it is possible to make a radial width of the first torque-transmitting spline teeth larger so that the strength of the first torque-transmitting spline teeth is enhanced.

In accordance with a twenty-sixth aspect of the present invention, the bicycle rear sprocket assembly according to any one of the twenty-third to twenty-fifth aspects is configured so that the plurality of first torque-transmitting spline teeth is disposed at least on the first hub-center facing side. The plurality of second torque-transmitting spline teeth is disposed at least on the second hub-center far side.

With the bicycle rear sprocket assembly according to the twenty-sixth aspect, it is possible to improve the coupling strength of the first torque-transmitting profile and the second torque-transmitting profile.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
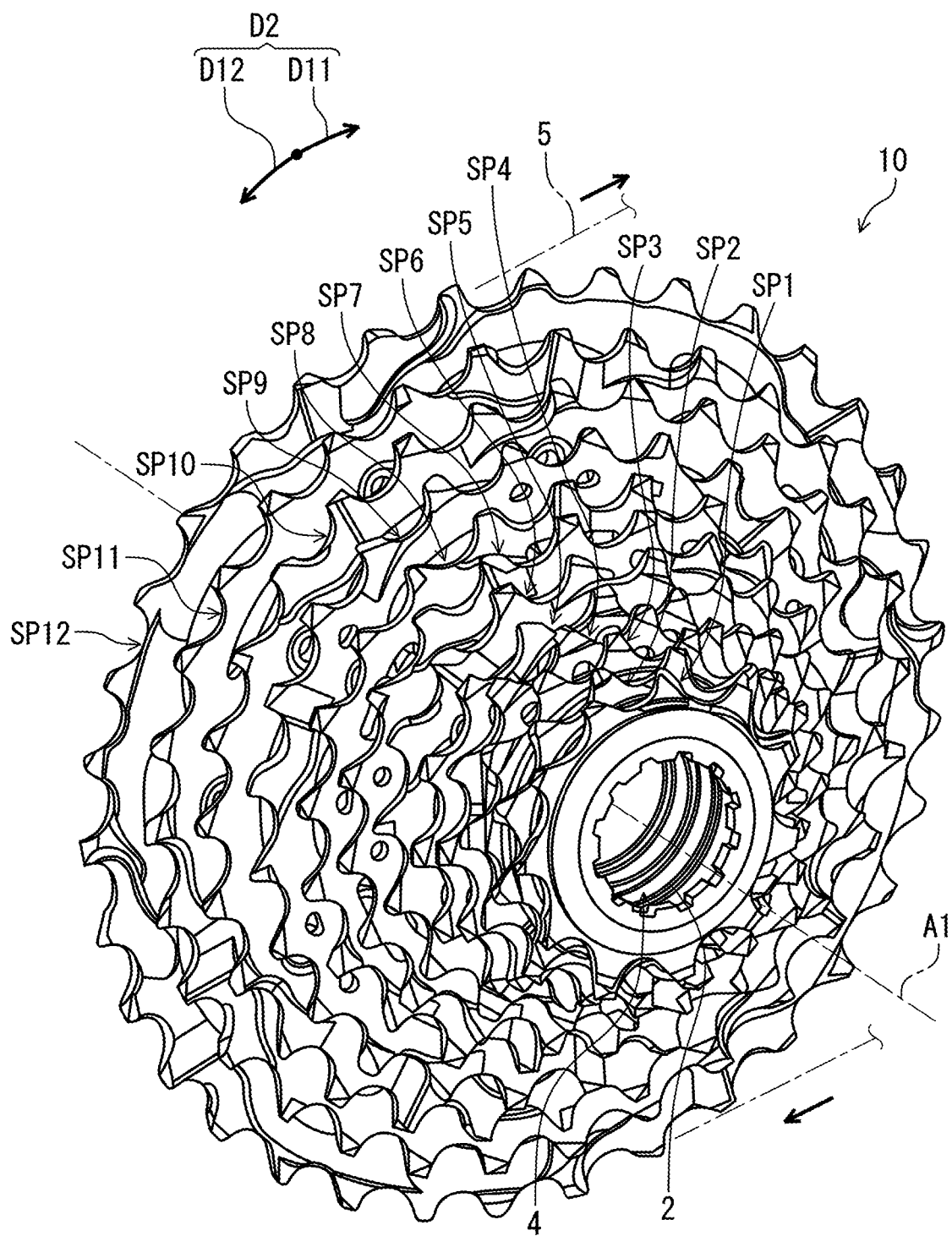
FIG. 1 is a perspective view of a bicycle rear sprocket assembly in accordance with an embodiment.

The embodiment(s) will now be described with reference to the accompanying drawings, wherein like reference numerals designate corresponding or identical elements throughout the various drawings.

Referring initially to FIG. 1, a bicycle rear sprocket assembly 10 is configured to be mounted to a sprocket support body 2 of a bicycle rear hub assembly 4. The bicycle rear sprocket assembly 10 is configured to engage with a chain 5. The bicycle rear sprocket assembly 10 is configured to rotate relative to a bicycle frame about a rotational center axis μl in a driving rotational direction D11 during pedaling. The driving rotational direction D11 is defined along a circumferential direction D2 of the bicycle rear sprocket assembly 10. A reverse rotational direction D12 is a reverse direction of the driving rotational direction D11 and is defined along the circumferential direction D2. The bicycle rear sprocket assembly 10 comprises a plurality of sprockets. In this embodiment, the plurality of sprockets includes first to twelfth sprockets SP1 to SP12. Namely, the bicycle rear sprocket assembly 10 comprises the first sprocket SP1 and the second sprocket SP2. However, a total number of the sprockets is not limited to this embodiment.

Figure 2:
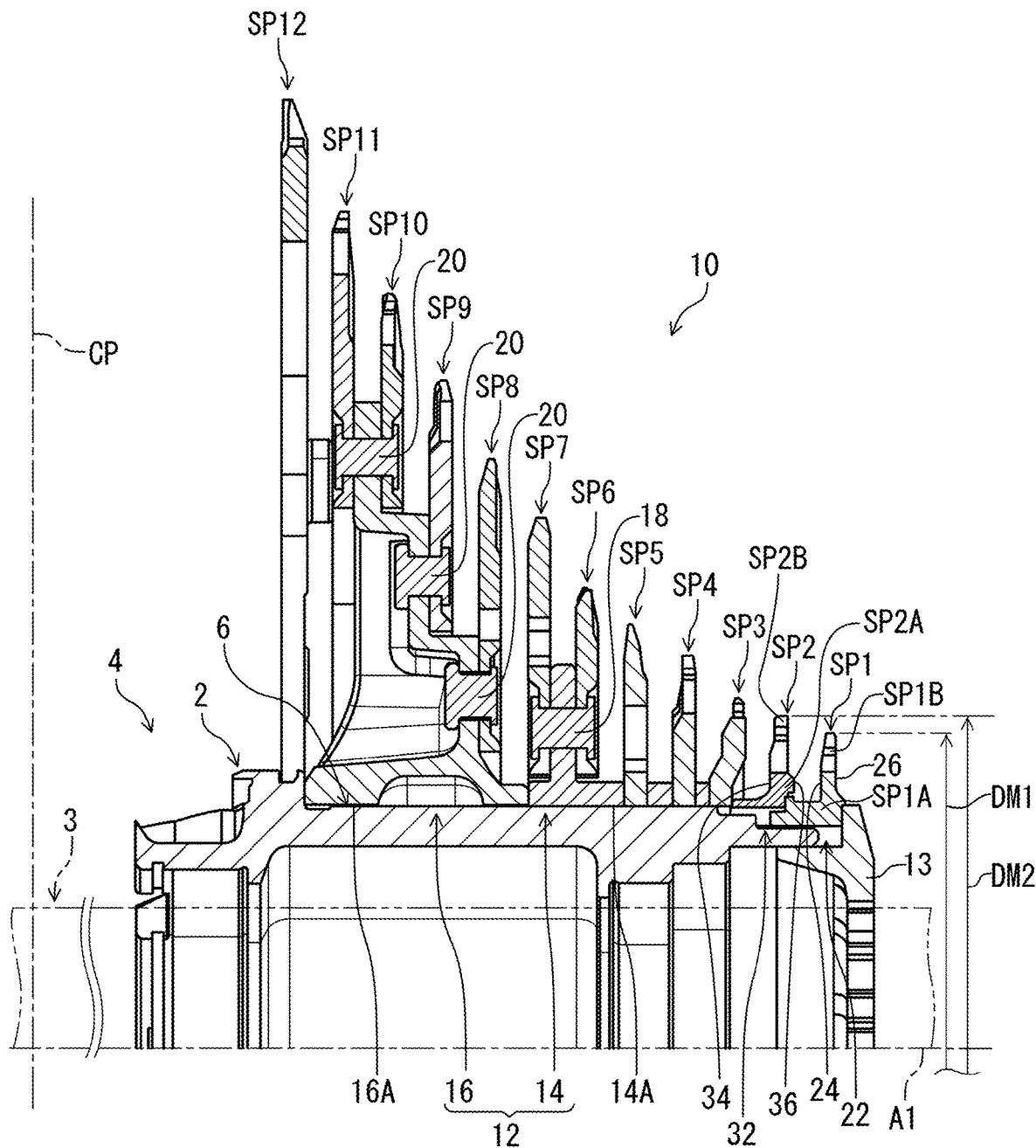
FIG. 2 is a cross-sectional view of the bicycle rear sprocket assembly illustrated in FIG. 1.

As seen in FIG. 2, the bicycle rear sprocket assembly 10 includes a sprocket carrier 12 and a lock ring 13. The first to fifth sprockets SP1 to SP5 and the sprocket carrier 12 are secured to the sprocket support body 2 of the bicycle rear hub assembly 4 with the lock ring 13. The sprocket carrier 12 is configured to engage with a hub torque-transmitting profile 6 of the sprocket support body 2. At least one of the plurality of sprockets is configured to be mounted to the sprocket carrier 12. The sprocket carrier 12 is a separate member from the plurality of sprockets in this embodiment. The first to fifth sprockets SP1 to SP5 are configured to be mounted to the sprocket support body 2 without the sprocket carrier 12. The sixth to twelfth sprockets SP6 to SP12 are configured to be mounted to the sprocket carrier 12. However, the sprocket carrier 12 can be omitted from the bicycle rear sprocket assembly 10.

The sprocket carrier 12 is configured to engage with the hub torque-transmitting profile 6 of the sprocket support body 2. In this embodiment, the sprocket carrier 12 includes a first sprocket carrier 14 and a second sprocket carrier 16. The first sprocket carrier 14 includes a first-carrier internal spline 14A configured to engage with the hub torque-transmitting profile 6 of the sprocket support body 2. The second sprocket carrier 16 includes a second-carrier internal spline 16A configured to engage with the hub torque-transmitting profile 6 of the sprocket support body 2. The sixth and seventh sprockets SP6 and SP7 are coupled to the first sprocket carrier 14 with a plurality of fasteners 18. The eighth to eleventh sprockets SP8 to SP11 are coupled to the second sprocket carrier 16 with a plurality of fasteners 20. In this embodiment, the twelfth sprocket SP12 is coupled to the eleventh sprocket SP11 with a plurality of fasteners. However, the twelfth sprocket SP12 is coupled to the second sprocket carrier 16 with a plurality of fasteners by modifying a shape of the second sprocket carrier 16. The second sprocket carrier 16 is a separate member from the first sprocket carrier 14. However, the second sprocket carrier 16 can be integrally provided with the first sprocket carrier 14.

Figure 3:
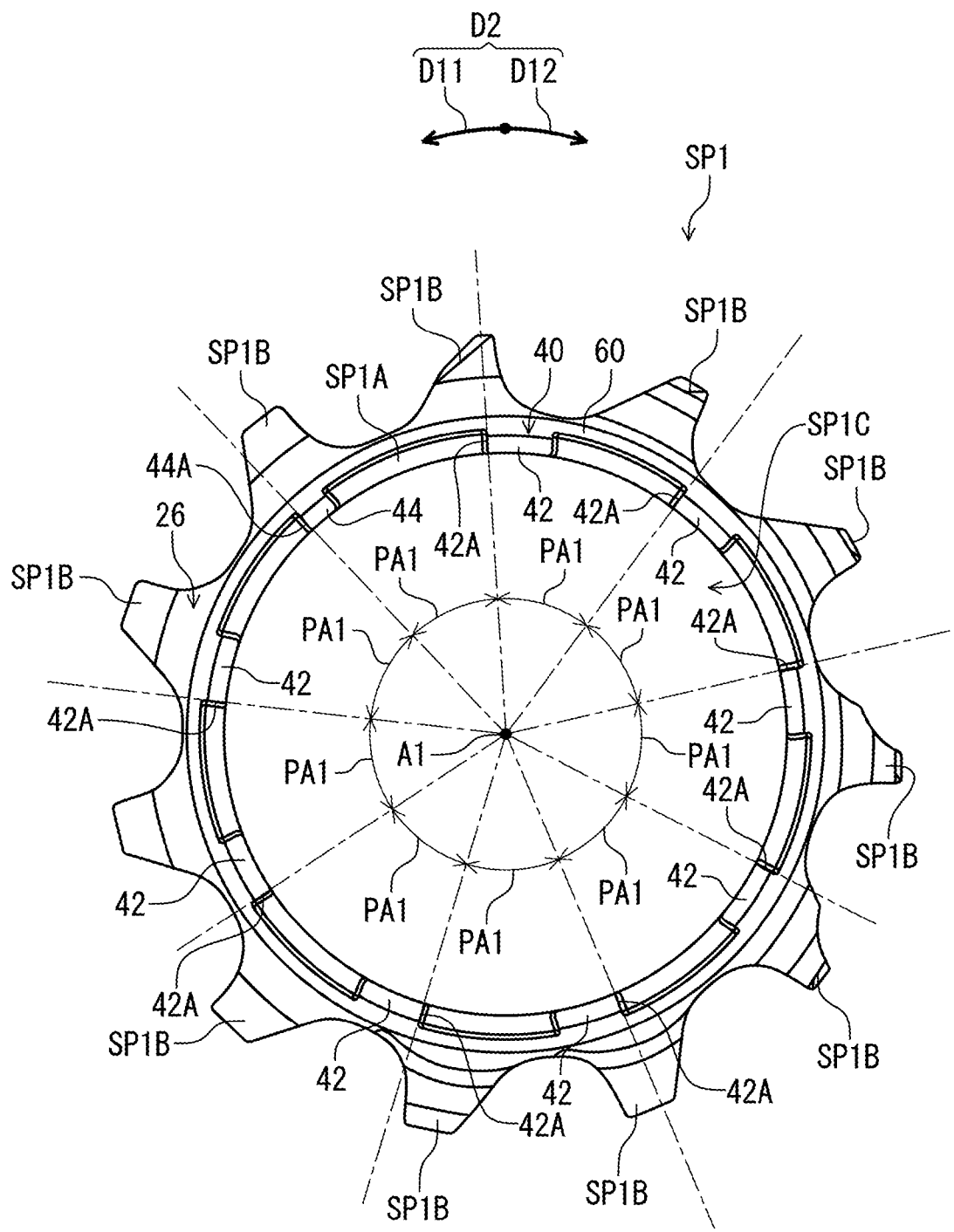
FIG. 3 is a side-elevational view of a first sprocket of the bicycle rear sprocket assembly illustrated in FIG. 1.

As seen in FIG. 3, the first sprocket SP1 includes a first sprocket body SP1A and a plurality of first sprocket teeth SP1B. The plurality of first sprocket teeth SP1B extends radially outwardly from the first sprocket body SP1A. The first sprocket SP1 has a first sprocket opening SP1C. The first sprocket body SP1A has an annular shape.

Figure 4:
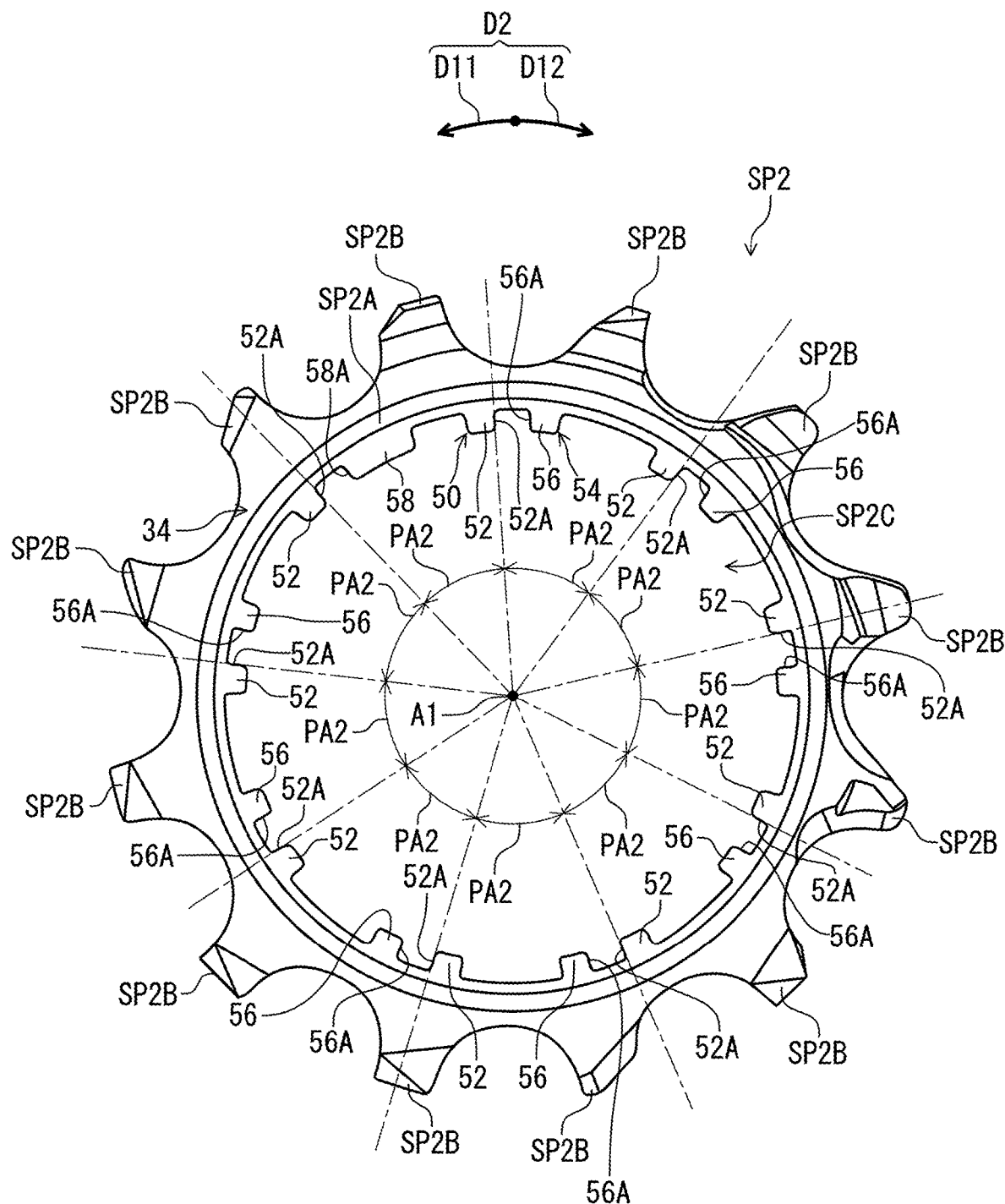
FIG. 4 is a side-elevational view of a second sprocket of the bicycle rear sprocket assembly illustrated in FIG. 1.

As seen in FIG. 4, the second sprocket SP2 includes a second sprocket body SP2A and a plurality of second sprocket teeth SP2B. The plurality of second sprocket teeth SP2B extends radially outwardly from the second sprocket body SP2A. The second sprocket SP2 has a second sprocket opening SP2C. The second sprocket body SP2A has an annular shape.

As seen in FIGS. 3 and 4, a total tooth number of the first sprocket SP1 is smaller than a total tooth number of the second sprocket SP2. Namely, a total number of the first sprocket teeth SP1B is smaller than a total number of the second sprocket teeth SP2B. The total tooth number of the first sprocket SP1 is equal to or smaller than fourteen. In this embodiment, the total tooth number of the first sprocket SP1 is 11. The total tooth number of the second sprocket SP2 is 12. However, the total tooth number of the first sprocket SP1 is not limited to this embodiment. The total tooth number of the second sprocket SP2 is not limited to this embodiment. The total number of the first sprocket teeth SP1B can be equal to or larger than the total number of the second sprocket teeth SP2B.

Figure 5:
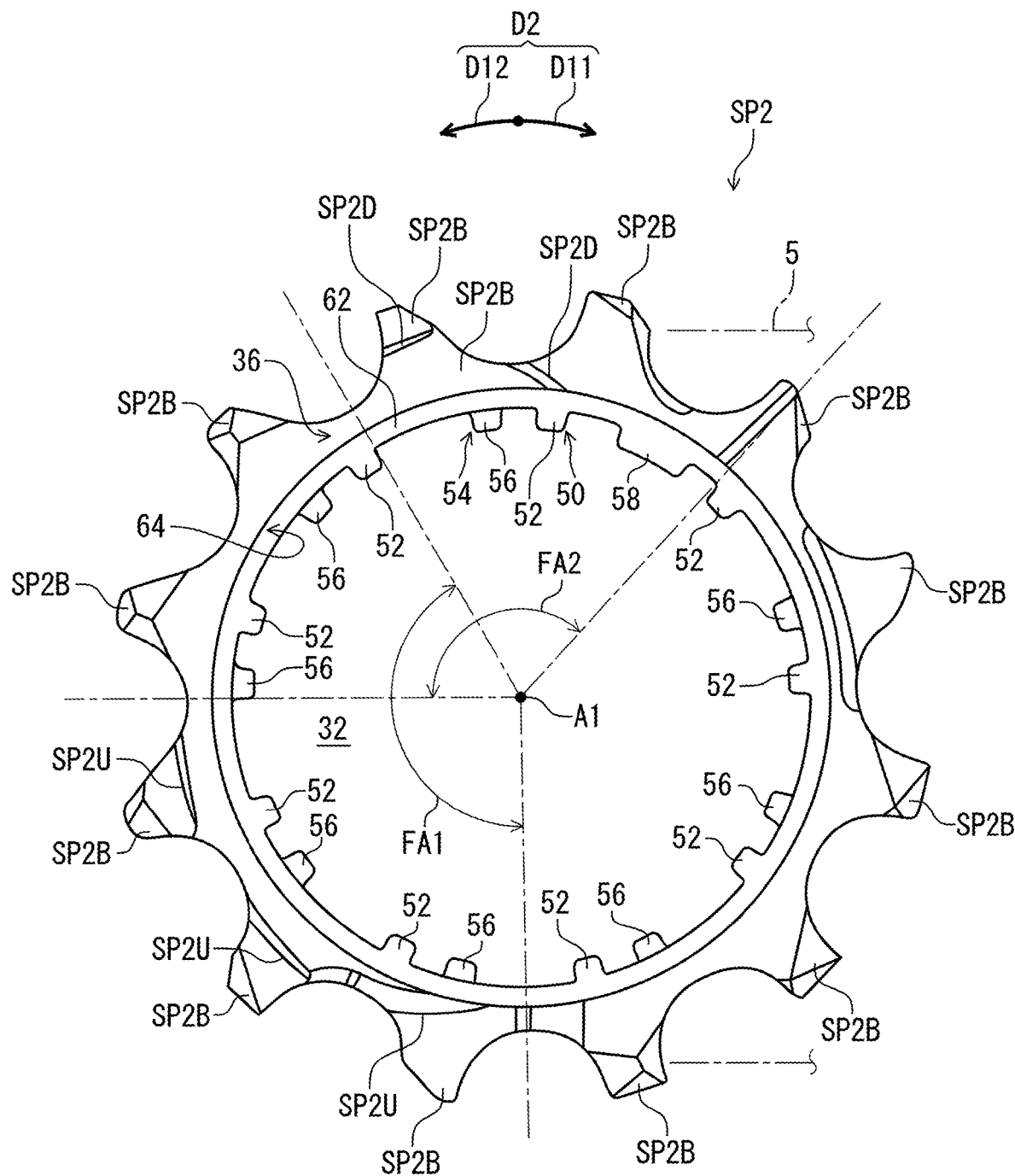
FIG. 5 is another side-elevational view of a second sprocket of the bicycle rear sprocket assembly illustrated in FIG. 1.

As seen in FIG. 5, the second sprocket SP2 includes an upshifting facilitation area FA1 and a downshifting facilitation area FA2. The upshifting facilitation area FA1 is configured to facilitate an upshifting operation in which the chain 5 is shifted from the second sprocket SP2 to the first sprocket SP1. The downshifting facilitation area FA2 is configured to facilitate a downshifting operation in which the chain 5 is shifted from the first sprocket SP1 to the second sprocket SP2.

The term "upshifting-facilitation area," as used herein, is intended to be an area intentionally designed to facilitate an upshifting operation where a chain is shifted from a larger rear sprocket to a smaller rear sprocket or from a smaller front sprocket to a larger front sprocket. The term "downshifting-facilitation area," as used herein, is intended to be an area intentionally designed to facilitate a downshifting operation where a chain is shifted from a smaller rear sprocket to a larger rear sprocket or from a larger front sprocket to a smaller front sprocket. Each of the second to twelfth sprockets SP2 to SP12 may include at least one upshifting-facilitation area and at least one downshifting-facilitation area. At least one of the second to twelfth sprockets SP2 to SP12 may include a plurality of upshifting-facilitation areas and a plurality of downshifting-facilitation areas. Preferably, a sprocket having a total tooth number more than fifteen includes a plurality of upshifting-facilitation areas and a plurality of downshifting-facilitation areas.

The second sprocket SP2 includes a plurality of upshifting facilitation recesses SP2U and a plurality of downshifting facilitation recesses SP2D. The second sprocket teeth SP2B including the upshifting facilitation recesses SP2U constitute the upshifting facilitation area FA1. The second sprocket teeth SP2B including the downshifting facilitation recesses SP2D constitute the downshifting facilitation area FA2.

The third to twelfth sprockets SP3 to SP12 have substantially the same structure as that of the first sprocket SP1 or the second sprocket SP2. Thus, they will not be described in detail here for the sake of brevity.

As seen in FIG. 2, the first sprocket SP1 has a first outer diameter DM1 defined by the plurality of first sprocket teeth SP1B. The second sprocket SP2 has a second outer diameter DM2 defined by the plurality of second sprocket teeth SP2B. The second outer diameter DM2 is larger than the first outer diameter DM1. However, the second outer diameter DM2 can be equal to or smaller than the first outer diameter DM1.

The first sprocket SP1 has a first hub-center facing side 24 and a first hub-center far side 26. The first hub-center far side 26 is provided on a reverse side of the first hub-center facing side 24 in an axial direction D3 with respect to the rotational center axis μl of the bicycle rear sprocket assembly 10. The first hub-center facing side 24 is configured to face toward an axial center plane CP of the bicycle rear hub assembly 4 in a mounted state where the bicycle rear sprocket assembly 10 is mounted to the bicycle rear hub assembly 4. For example, the axial center plane CP is defined to bisect an axial length of a hub axle 3 of the bicycle rear hub assembly 4 in the axial direction D3. The first hub-center facing side 24 is configured to face toward the second sprocket SP2 in the axial direction D3 in the mounted state.

The second sprocket SP2 has a second hub-center facing side 34 and a second hub-center far side 36. The second hub-center far side 36 is provided on a reverse side of the second hub-center facing side 34 in the axial direction D3. The second hub-center facing side 34 is configured to face toward the axial center plane CP of the bicycle rear hub assembly 4 in the mounted state. The second sprocket SP2 is configured to be disposed closer to the axial center plane CP of the bicycle rear hub assembly 4 than the first sprocket SP1 in the mounted state. The second sprocket SP2 is provided between the first sprocket SP1 and the axial center plane CP in the axial direction D3 in the mounted state. The second hub-center far side 36 is configured to face toward the first sprocket SP1 in the axial direction D3 in the mounted state. The first sprocket SP1 is adjacent to the second sprocket SP2 without another sprocket between the first sprocket SP1 and the second sprocket SP2 in the axial direction D3 in the mounted state.

In this embodiment, the first sprocket SP1 is configured to be disposed axially outwardly from the sprocket support body 2 of the bicycle rear hub assembly 4 with respect to the rotational center axis μl in the mounted state. However, the second sprocket SP2 can be configured to be disposed axially outwardly from the sprocket support body 2 of the bicycle rear hub assembly 4 with respect to the rotational center axis μl in the mounted state.

Figure 6:
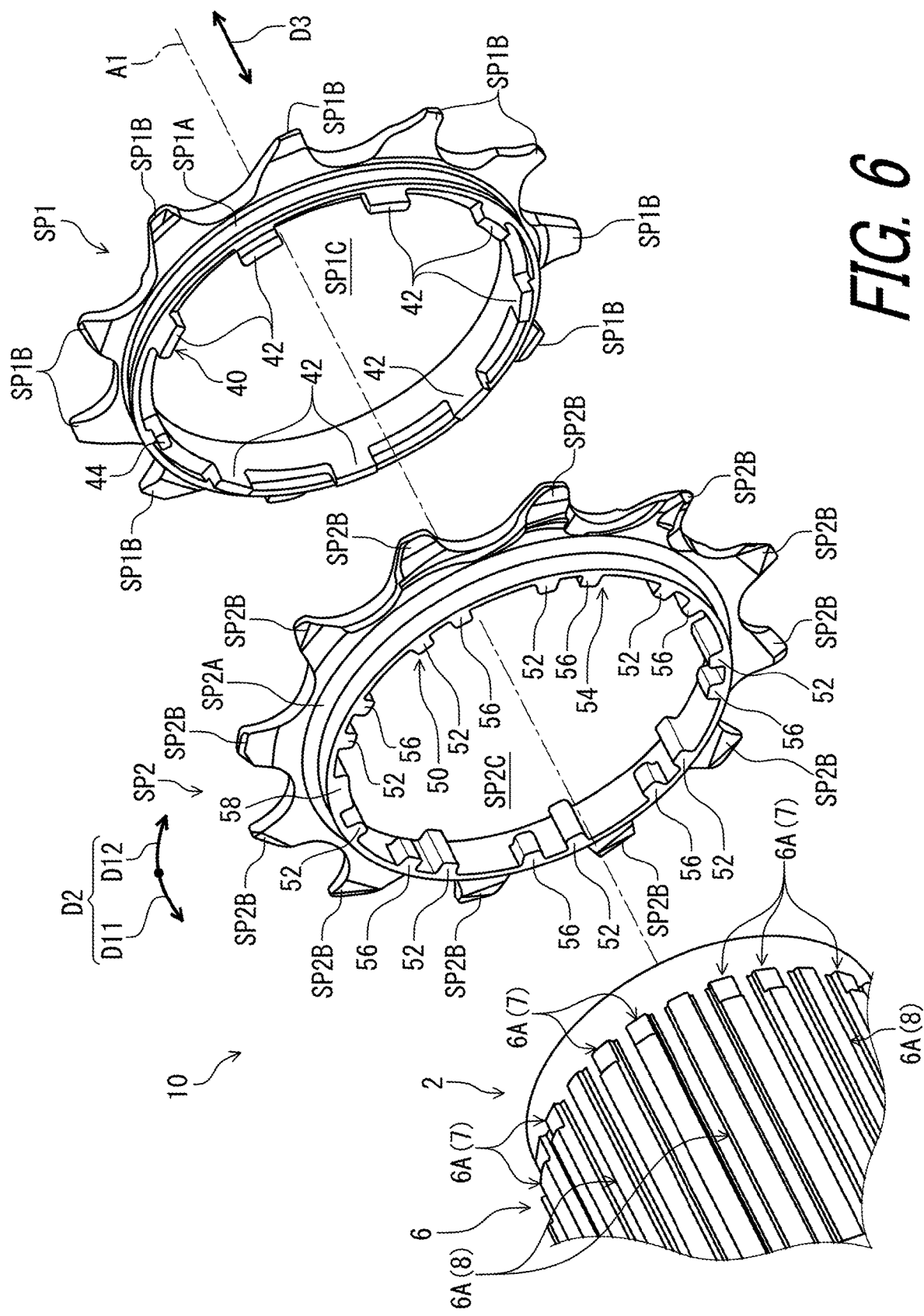
FIG. 6 is a partial exploded perspective view of the bicycle rear sprocket assembly illustrated in FIG. 1, with a sprocket support body of a bicycle rear hub assembly.

As seen in FIG. 6, the first sprocket SP1 includes a first torque-transmitting profile 40. The first torque-transmitting profile 40 is disposed around the first sprocket opening SP1C. The first torque-transmitting profile 40 includes at least one first torque-transmitting spline tooth 42. The first torque-transmitting profile 40 includes a plurality of first torque-transmitting spline teeth 42. Namely, the first sprocket SP1 includes a plurality of first torque-transmitting spline teeth 42. The plurality of first torque-transmitting spline teeth 42 is disposed around the first sprocket opening SP1C. The plurality of first torque-transmitting spline teeth 42 extends from the first sprocket body SP1A toward the second sprocket SP2 in the axial direction D3.

The first torque-transmitting profile 40 includes a first additional torque-transmitting spline tooth 44. The first additional torque-transmitting spline tooth 44 has substantially the same structure as that of the first torque-transmitting spline tooth 42. The first additional torque-transmitting spline tooth 44 is different from the first torque-transmitting spline tooth 42 in at least one of size and shape. In this embodiment, the first additional torque-transmitting spline tooth 44 is different from the first torque-transmitting spline tooth 42 in both size and shape. However, the first additional torque-transmitting spline tooth 44 can be different from the first torque-transmitting spline tooth 42 in one of size and shape. The first additional torque-transmitting spline tooth 44 can be the same as the first torque-transmitting spline tooth 42 in at least one of size and shape.

The second sprocket SP2 includes a second torque-transmitting profile 50. The second torque-transmitting profile 50 is disposed around the second sprocket opening SP2C. The second torque-transmitting profile 50 includes at least one second torque-transmitting spline tooth 52. The second torque-transmitting profile 50 includes a plurality of second torque-transmitting spline teeth 52. Namely, the second sprocket SP2 includes a plurality of second torque-transmitting spline teeth 52. The second torque-transmitting spline tooth 52 can also be referred to as a torque-transmitting spline tooth 52. Thus, the second torque-transmitting profile 50 of the second sprocket SP2 includes at least one torque-transmitting spline tooth 52. The second torque-transmitting profile 50 includes a plurality of torque-transmitting spline teeth 52. The plurality of second torque-transmitting spline teeth 52 is disposed around the second sprocket opening SP2C. The plurality of second torque-transmitting spline teeth 52 extends radially inwardly from the second sprocket body SP2A. The plurality of second torque-transmitting spline teeth 52 of the second torque-transmitting profile 50 defines the second sprocket opening SP2C.

The second sprocket SP2 includes a third torque-transmitting profile 54. The third torque-transmitting profile 54 is disposed around the second sprocket opening SP2C. The third torque-transmitting profile 54 includes at least one third torque-transmitting spline tooth 56. The third torque-transmitting profile 54 includes a plurality of third torque-transmitting spline teeth 56. Namely, the second sprocket SP2 includes a plurality of third torque-transmitting spline teeth 56. The third torque-transmitting spline tooth 56 can also be referred to as an additional torque-transmitting spline tooth 56. Thus, the third torque-transmitting profile 54 of the second sprocket SP2 includes at least one additional torque-transmitting spline tooth 56. The second torque-transmitting profile 50 includes a plurality of additional torque-transmitting spline teeth 56. The plurality of third torque-transmitting spline teeth 56 is disposed around the second sprocket opening SP2C. The plurality of third torque-transmitting spline teeth 56 extends radially inwardly from the second sprocket body SP2A. The plurality of third torque-transmitting spline teeth 56 of the third torque-transmitting profile 54 defines the second sprocket opening SP2C. The third torque-transmitting profile 54 is offset from the second torque-transmitting profile 50 in the circumferential direction D2 with respect to the rotational center axis μ1.

The second torque-transmitting profile 50 of the second sprocket SP2 includes a further additional torque-transmitting spline tooth 58. The further additional torque-transmitting spline tooth 58 is different from the at least one torque-transmitting spline tooth 52 and the at least one additional torque-transmitting spline tooth 56 in at least one of size and shape. In this embodiment, the further additional torque-transmitting spline tooth 58 is different from the at least one torque-transmitting spline tooth 52 and the at least one additional torque-transmitting spline tooth 56 in both size and shape. However, the further additional torque-transmitting spline tooth 58 can be different from the at least one torque-transmitting spline tooth 52 and the at least one additional torque-transmitting spline tooth 56 in one of size and shape. The further additional torque-transmitting spline tooth 58 can also be referred to as a fourth torque-transmitting spline tooth 58.

The hub torque-transmitting profile 6 of the sprocket support body 2 includes a plurality of hub torque-transmitting spline teeth 6A. In this embodiment, the plurality of hub torque-transmitting spline teeth 6A includes a plurality of first external-spline teeth 7 and a plurality of second external-spline teeth 8. Two first external-spline teeth 7 of the plurality of first external-spline teeth 7 is provided between two of the plurality of second external-spline teeth 8. The first external-spline tooth 7 has a shape different from a shape of the second external-spline tooth 8. However, the structure of the hub torque-transmitting profile 6 is not limited to this embodiment.

As seen in FIG. 3, the first torque-transmitting spline tooth 42 includes a first driving surface 42A facing in the driving rotational direction D11. The first additional torque-transmitting spline tooth 44 includes a first additional driving surface 44A facing in the driving rotational direction D11. The first torque-transmitting spline teeth 42 and the first additional torque-transmitting spline tooth 44 are arranged in the circumferential direction D2 at a first pitch angle PA1. The first driving surfaces 42A and the first additional driving surface 44A are arranged in the circumferential direction D2 at the first pitch angle PA1. However, the arrangement of the first torque-transmitting spline teeth 42 and the first additional torque-transmitting spline tooth 44 is not limited to this embodiment.

As seen in FIG. 4, the second torque-transmitting spline tooth 52 includes a second receiving surface 52A facing in the reverse rotational direction D12. The second torque-transmitting spline teeth 52 are arranged in the circumferential direction D2 at a second pitch angle PA2. The second receiving surfaces 52A are arranged in the circumferential direction D2 at the second pitch angle PA2. A total number of the second torque-transmitting spline teeth 52 is equal to a total number of the first torque-transmitting spline teeth 42. Namely, the second pitch angle PA2 is equal to the first pitch angle PA1. However, the arrangement of the second torque-transmitting spline teeth 52 is not limited to this embodiment. The total number of the second torque-transmitting spline teeth 52 can be different from the total number of the first torque-transmitting spline teeth 42. Namely, the second pitch angle PA2 can be different from the first pitch angle PA1.

Figure 7:
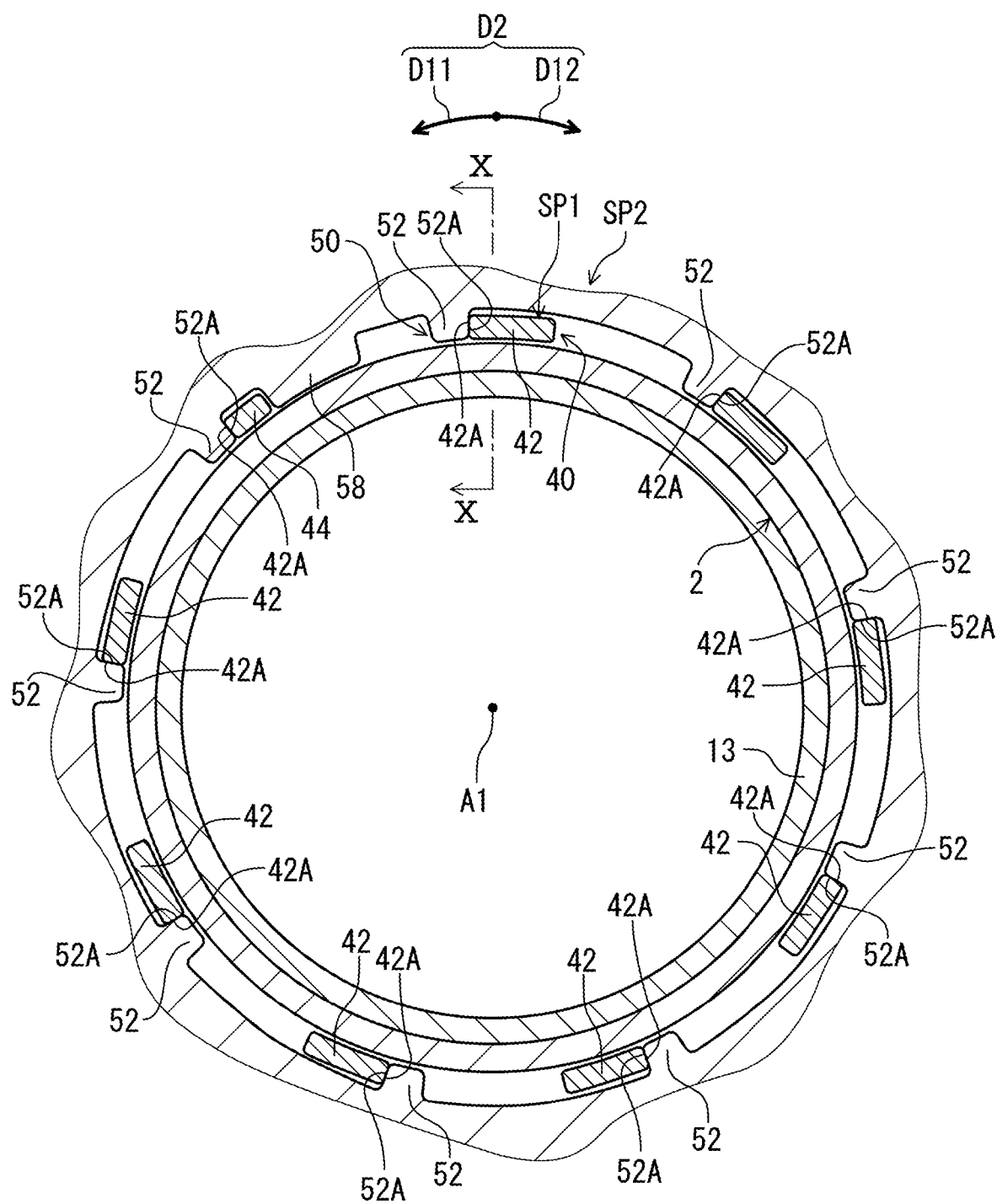
FIG. 7 is a cross-sectional view of the bicycle rear sprocket assembly taken along line VII-VII of FIG. 10.

As seen in FIG. 7, the first torque-transmitting profile 40 of the first sprocket SP1 is configured to engage with the second torque-transmitting profile 50 of the second sprocket SP2 in the mounted state. The first torque-transmitting profile 40 of the first sprocket SP1 is configured to engage with the second torque-transmitting profile 50 of the second sprocket SP2 to transmit a rotational force between the first torque-transmitting profile 40 and the second torque-transmitting profile 50 in the mounted state.

In this embodiment, the plurality of the first torque-transmitting spline teeth 42 of the first sprocket SP1 is configured to engage with the plurality of the second torque-transmitting spline teeth 52 of the second sprocket SP2 in the mounted state. The plurality of the first torque-transmitting spline teeth 42 of the first sprocket SP1 is configured to engage with the plurality of the second torque-transmitting spline teeth 52 of the second sprocket SP2 to transmit a rotational force between the first torque-transmitting profile 40 and the second torque-transmitting profile 50 in the mounted state. The first torque-transmitting spline tooth 42 is contactable with the second torque-transmitting spline tooth 52 in the circumferential direction D2 to transmit a rotational force between the first sprocket SP1 and the second sprocket SP2 in the mounted state. The first driving surface 42A is contactable with the second receiving surface 52A in the circumferential direction D2 to transmit the rotational force between the first sprocket SP1 and the second sprocket SP2 in the mounted state.

Figure 8:
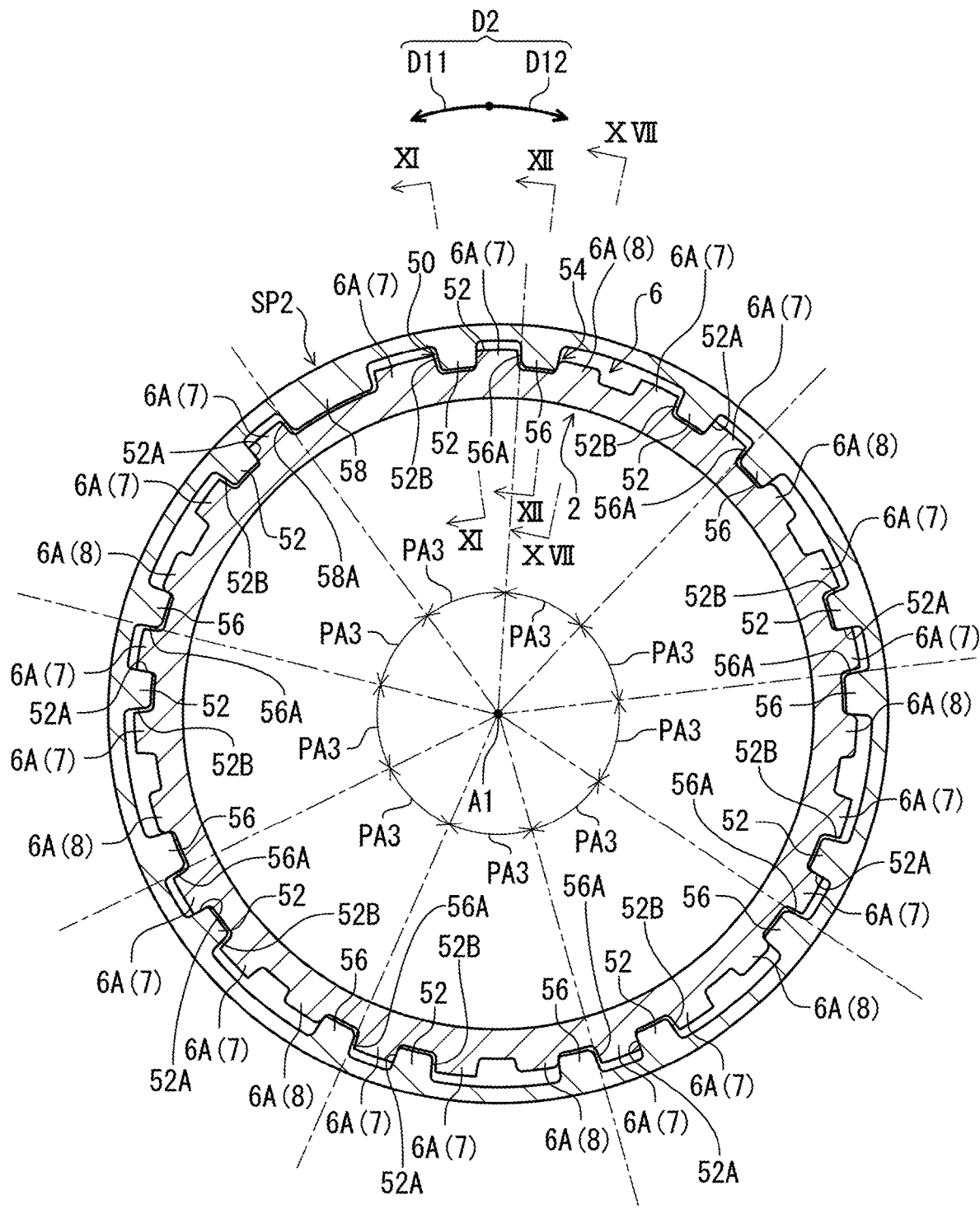
FIG. 8 is a cross-sectional view of the bicycle rear sprocket assembly taken along line VIII-VIII of FIG. 12.

As seen in FIG. 8, the second torque-transmitting profile 50 of the second sprocket SP2 is configured to engage with the hub torque-transmitting profile 6 of the sprocket support body 2 in the mounted state. The second torque-transmitting profile 50 of the second sprocket SP2 is configured to engage with the hub torque-transmitting profile 6 of the sprocket support body 2 on the second hub-center facing side 34 in the mounted state. Thus, as seen in FIGS. 7 and 8, the second torque-transmitting profile 50 of the second sprocket SP2 is configured to engage with the first torque-transmitting profile 40 of the first sprocket SP1 and the hub torque-transmitting profile 6 of the sprocket support body 2 in the mounted state. The at least one torque-transmitting spline tooth 52 is configured to engage with the first torque-transmitting profile 40 of the first sprocket SP1 and the hub torque-transmitting profile 6 of the sprocket support body 2 in the mounted state.

The second torque-transmitting spline tooth 52 is configured to engage with the hub torque-transmitting spline tooth 6A to transmit a rotational force between the second torque-transmitting profile 50 and the hub torque-transmitting profile 6 in the mounted state. The second torque-transmitting spline tooth 52 is contactable with the hub torque-transmitting spline tooth 6A in the circumferential direction D2 to transmit a rotational force between the second torque-transmitting profile 50 and the hub torque-transmitting profile 6 in the mounted state.

The second torque-transmitting spline tooth 52 includes a second driving surface 52B facing in the driving rotational direction D11. The second driving surface 52B is provided on a reverse side of the second receiving surface 52A in the circumferential direction D2. The second driving surfaces 52B are arranged in the circumferential direction D2. The second driving surface 52B is contactable with the hub torque-transmitting spline tooth 6A in the circumferential direction D2 to transmit a rotational force between the second torque-transmitting profile 50 and the hub torque-transmitting profile 6 in the mounted state.

Figure 9:
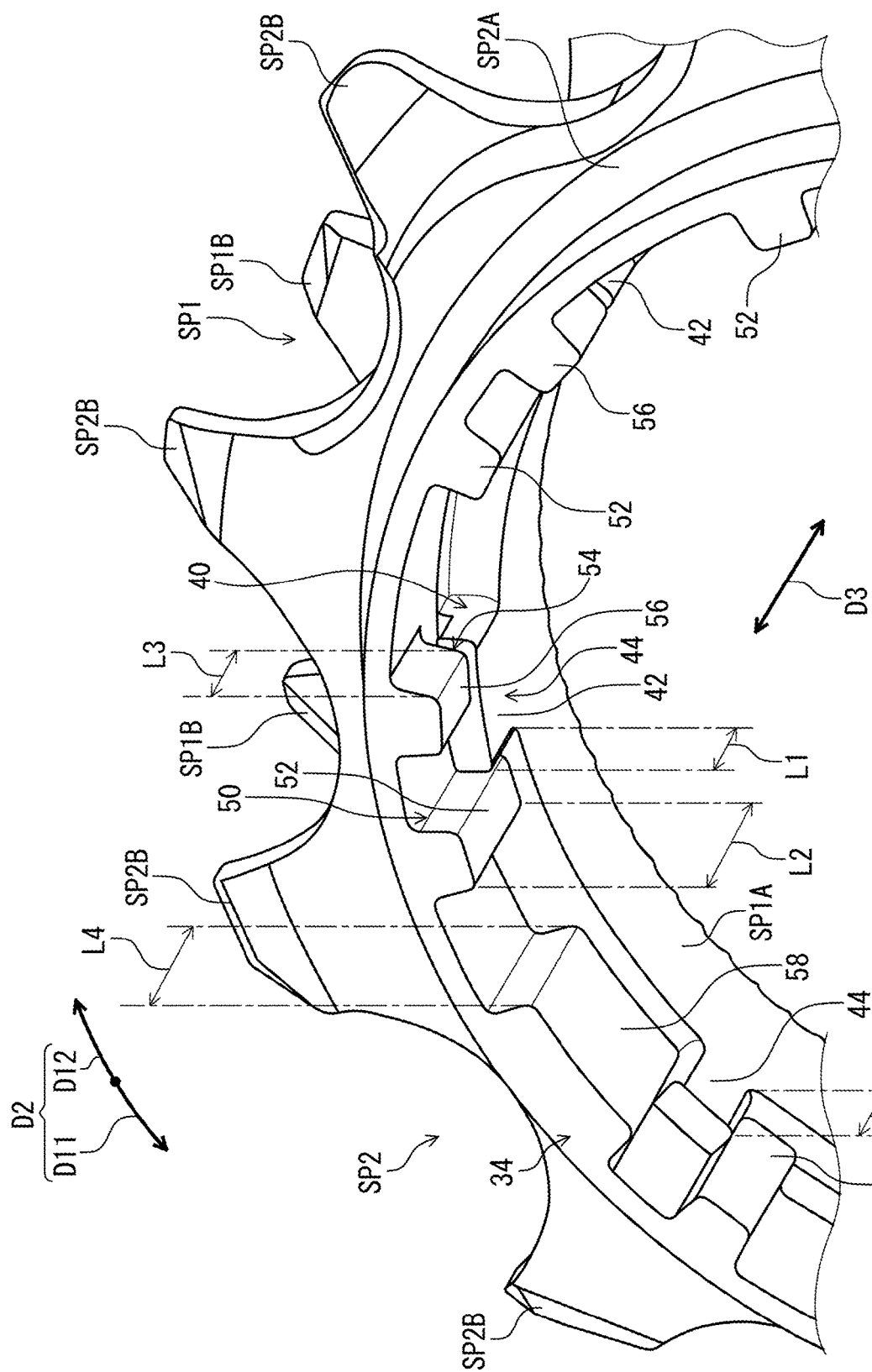
FIG. 9 is a partial perspective view of the first sprocket and the second sprocket of the bicycle rear sprocket assembly illustrated in FIG. 1.

As seen in FIG. 8, the third torque-transmitting profile 54 of the second sprocket SP2 is configured to engage with the hub torque-transmitting profile 6 of the sprocket support body 2 in the mounted state. The third torque-transmitting profile 54 of the second sprocket SP2 is configured to engage with the hub torque-transmitting profile 6 of the sprocket support body 2 in the mounted state without engaging with the first torque-transmitting profile 40. As seen in FIG. 9, however, the at least one additional torque-transmitting spline tooth 56 is configured to be free of engagement with the first torque-transmitting profile 40 of the first sprocket SP1 and to engage with the hub torque-transmitting profile 6 of the sprocket support body 2 in the mounted state.

As seen in FIG. 8, the third torque-transmitting spline tooth 56 is configured to engage with the hub torque-transmitting spline tooth 6A to transmit a rotational force between the third torque-transmitting profile 54 and the hub torque-transmitting profile 6 in the mounted state. The third torque-transmitting spline tooth 56 is contactable with the hub torque-transmitting spline tooth 6A in the circumferential direction D2 to transmit a rotational force between the third torque-transmitting profile 54 and the hub torque-transmitting profile 6 in the mounted state.

The additional torque-transmitting spline tooth 56 includes a third driving surface 56A facing in the driving rotational direction D11. The further additional torque-transmitting spline tooth 58 includes a fourth driving surface 58A facing in the driving rotational direction D11. The additional torque-transmitting spline teeth 56 and the further additional torque-transmitting spline tooth 58 are arranged in the circumferential direction D2 at a third pitch angle PA3. The plurality of third driving surfaces 56A and the fourth driving surface 58A are arranged in the circumferential direction D2 at the third pitch angle PA3. The third pitch angle PA3 is equal to the first pitch angle PA1 and the second pitch angle PA2. However, the arrangement of the third torque-transmitting spline teeth 56 is not limited to this embodiment. The third pitch angle PA3 can be different from at least one of the first pitch angle PA1 and the second pitch angle PA2.

Figure 10:
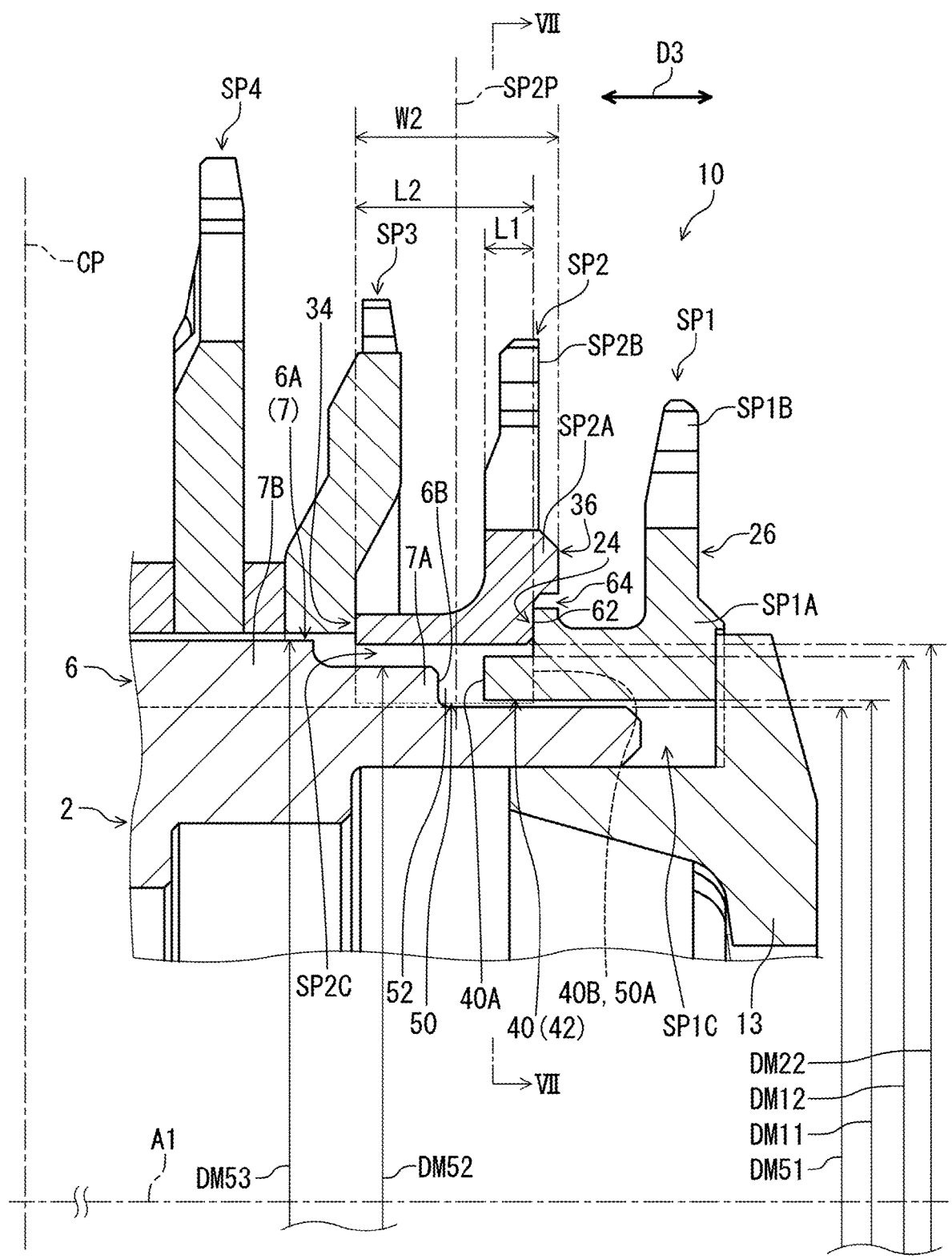
FIG. 10 is a cross-sectional view of the bicycle rear sprocket assembly taken along line X-X of FIG. 7.

As seen in FIG. 10, the first torque-transmitting profile 40 is disposed at least on the first hub-center facing side 24. The first torque-transmitting profile 40 is disposed around the first sprocket opening SP1C at least on the first hub-center facing side 24. The plurality of first torque-transmitting spline teeth 42 is disposed at least on the first hub-center facing side 24.

In this embodiment, the first torque-transmitting profile 40 extends from the first sprocket body SP1A in the axial direction D3. The at least one first torque-transmitting spline tooth 42 extends from the first sprocket body SP1A toward the second sprocket SP2 in the axial direction D3. The first torque-transmitting profile 40 does not extend radially inwardly from the first sprocket body SP1A in this embodiment. The first torque-transmitting spline tooth 42 does not extend radially inwardly from the first sprocket body SP1A in this embodiment. However, the first torque-transmitting profile 40 and the first torque-transmitting spline tooth 42 can be configured to extend radially inwardly from the first sprocket body SP1A.

The first torque-transmitting profile 40 includes a first axial end 40A disposed closer to the first hub-center facing side 24 than to the first hub-center far side 26 in the axial direction D3. The first torque-transmitting profile 40 includes a first additional axial end 40B provided on a reverse side of the first axial end 40A in the axial direction D3. The first additional axial end 40B is provided between the first axial end 40A and the first hub-center far side 26 in the axial direction D3. The first torque-transmitting spline tooth 42 extends from the first additional axial end 40B to the first axial end 40A in the axial direction D3.

The at least one first torque-transmitting spline tooth 42 has a first axial spline length L1 defined in the axial direction D3. The first axial spline length L1 is defined between the first axial end 40A and the first additional axial end 40B in the axial direction D3. In this embodiment, the first torque-transmitting spline tooth 42 extends from the first hub-center facing side 24 toward the second hub-center facing side 34 of the second sprocket SP2 in the axial direction D3. The first additional axial end 40B is offset from the first hub-center facing side 24 in the axial direction D3. The first additional axial end 40B is provided on the first hub-center facing side 24. However, the axial positions of the first axial end 40A and the first additional axial end 40B are not limited to this embodiment. The first additional axial end 40B can be provided on the first hub-center facing side 24. The first additional axial end 40B can be offset from the first hub-center facing side 24.

The first torque-transmitting spline tooth 42 is spaced apart from the hub torque-transmitting spline tooth 6A in the axial direction D3 to not directly transmit a rotational force between the first torque-transmitting profile 40 and the hub torque-transmitting profile 6 in the mounted state. The hub torque-transmitting spline tooth 6A includes an axial tooth end 6B provided farthest from the axial center plane CP of the bicycle rear hub assembly 4 in the axial direction D3. The first torque-transmitting spline tooth 42 is spaced apart from the axial tooth end 6B of the hub torque-transmitting spline tooth 6A in the axial direction D3 in the mounted state.

The first torque-transmitting spline tooth 42 is spaced apart from the third torque-transmitting spline tooth 56 in the axial direction D3 to not directly transmit a rotational force between the first torque-transmitting profile 40 and the third torque-transmitting profile 54 in the mounted state.

In this embodiment, the first sprocket SP1 is disposed on the sprocket support body 2 of the bicycle rear hub assembly 4 in the mounted state. However, the first sprocket SP1 can be disposed entirely outside the sprocket support body 2 of the bicycle rear hub assembly 4 in the axial direction D3 in the mounted state.

Figure 11:
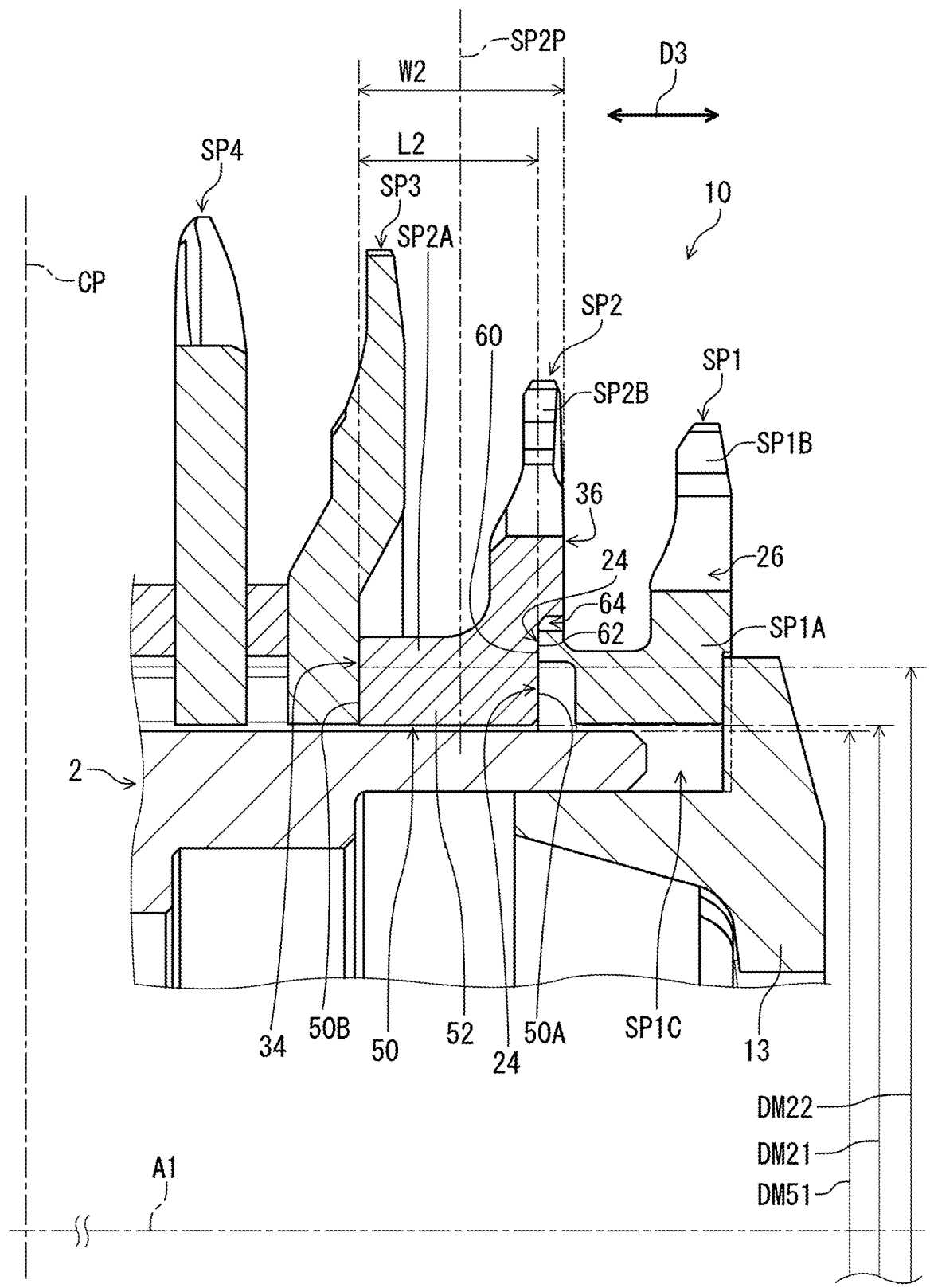
FIG. 11 is a cross-sectional view of the bicycle rear sprocket assembly taken along line XI-XI of FIG. 8.

As seen in FIG. 11, the second torque-transmitting profile 50 is disposed at least on the second hub-center far side 36. The second torque-transmitting profile 50 is disposed around the second sprocket opening SP2C at least on the second hub-center far side 36. The plurality of second torque-transmitting spline teeth 52 is disposed at least on the second hub-center far side 36.

In this embodiment, the second torque-transmitting profile 50 extends from the second hub-center facing side 34 to the second hub-center far side 36. Namely, the second torque-transmitting profile 50 is disposed on both the second hub-center facing side 34 and the second hub-center far side 36. However, the second torque-transmitting profile 50 can be disposed on only one of the second hub-center facing side 34 and the second hub-center far side 36. The second torque-transmitting profile 50 can be offset from both the second hub-center facing side 34 and the second hub-center far side 36.

The at least one torque-transmitting spline tooth 52 extends in the axial direction D3. The at least one torque-transmitting spline tooth 52 extends from the second hub-center facing side 34 to the second hub-center far side 36 in the axial direction D3. However, one axial end of the torque-transmitting spline tooth 52 can be offset from the second hub-center facing side 34. The other axial end of the torque-transmitting spline tooth 52 can be offset from the second hub-center far side 36 in the axial direction D3.

The second torque-transmitting profile 50 is disposed around the second sprocket opening SP2C so that the second torque-transmitting profile 50 extends at least between the second hub-center facing side 34 and the second hub-center far side 36. The second torque-transmitting profile 50 includes a second axial end 50A disposed closer to the second hub-center far side 36 than to the second hub-center facing side 34 in the axial direction D3. The second torque-transmitting profile 50 includes a second additional axial end 50B provided on a reverse side of the second axial end 50A in the axial direction D3. The second additional axial end 50B is provided between the second axial end 50A and the second hub-center facing side 34 in the axial direction D3. The second torque-transmitting spline tooth 52 extends from the second axial end 50A to the second additional axial end 50B in the axial direction D3.

The at least one torque-transmitting spline tooth 52 has an axial spline length L2 defined in the axial direction D3. The axial spline length L2 is defined between the second axial end 50A and the second additional axial end 50B in the axial direction D3. In this embodiment, the second axial end 50A is provided on the second hub-center far side 36. The second additional axial end 50B is provided on the second hub-center facing side 34. However, the axial positions of the second axial end 50A and the second additional axial end 50B are not limited to this embodiment. The second axial end 50A can be offset from the second hub-center far side 36 in the axial direction D3. The second additional axial end 50B can be offset from the second hub-center facing side 34 in the axial direction D3. The axial spline length L2 can also be referred to as a second axial spline length L2.

The second sprocket SP2 is disposed on the sprocket support body 2 of the bicycle rear hub assembly 4 in the mounted state. The second torque-transmitting profile 50 of the second sprocket SP2 is configured to engage with the first torque-transmitting profile 40 of the first sprocket SP1 on the second hub-center far side 36 in the mounted state. The first torque-transmitting spline tooth 42 at least partly overlaps with the second torque-transmitting spline tooth 52 in the axial direction D3 to transmit a rotational force between the first torque-transmitting profile 40 and the second torque-transmitting profile 50 in the mounted state. The second torque-transmitting spline tooth 52 at least partly overlaps with the hub torque-transmitting spline tooth 6A in the axial direction D3 to transmit a rotational force between the second torque-transmitting profile 50 and the hub torque-transmitting profile 6 in the mounted state.

The second torque-transmitting profile 50 extends beyond a sprocket axial center plane SP2P of the second sprocket SP2. The second sprocket SP2 has a maximum axial width W2 defined from the second hub-center facing side 34 to the second hub-center far side 36 in the axial direction D3. The sprocket axial center plane SP2P is defined to bisect the maximum axial width W2 and is perpendicular to the rotational center axis μl. The sprocket axial center plane SP2P of the second sprocket SP2 is provided between the second axial end 50A and the second additional axial end 50B of the second torque-transmitting profile 50 in the axial direction D3. However, the positional relationship between the second torque-transmitting profile 50 and the sprocket axial center plane SP2P is not limited to this embodiment.

Figure 12:
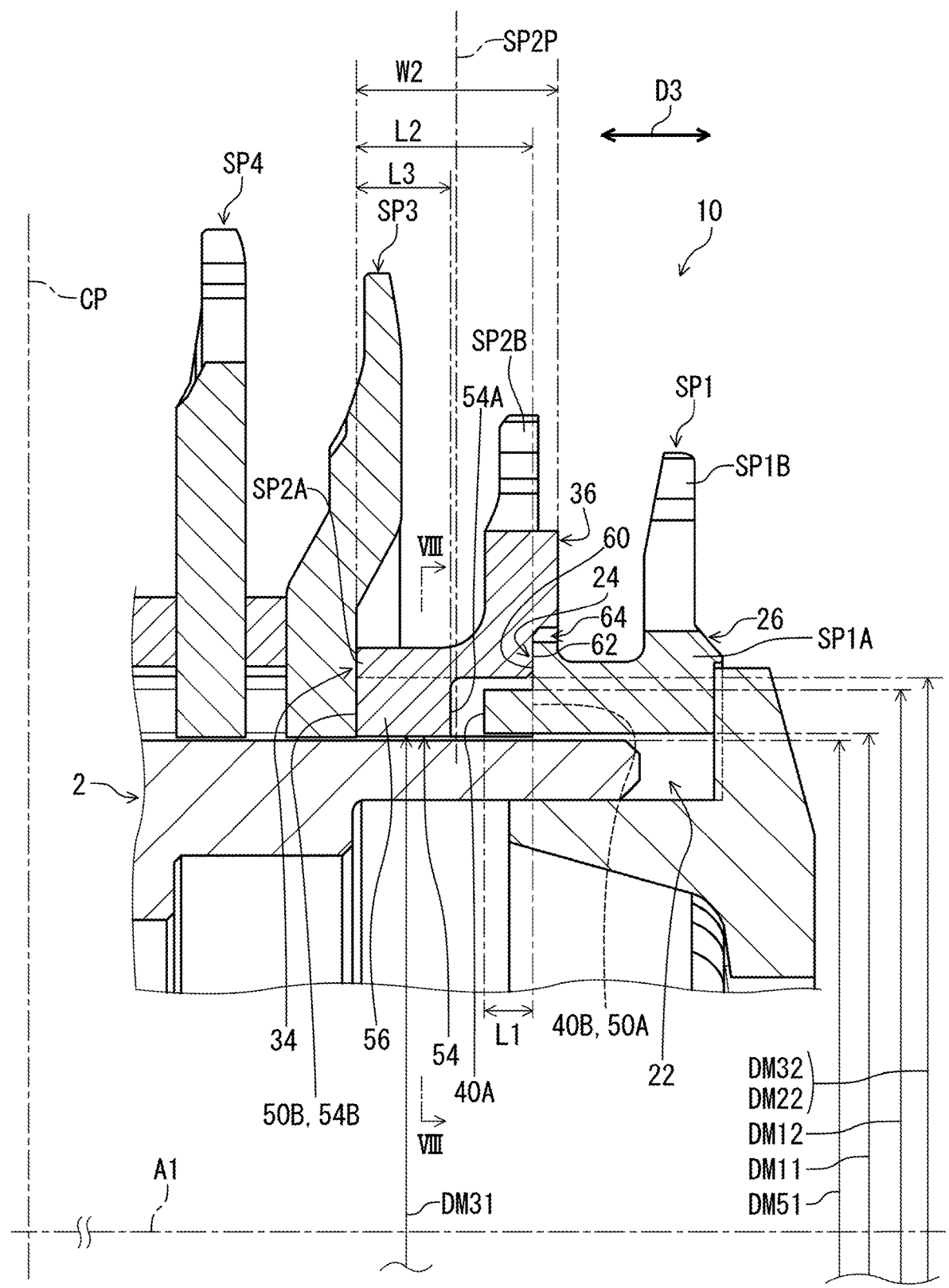
FIG. 12 is a cross-sectional view of the bicycle rear sprocket assembly taken along line XII-XII of FIG. 8.

As seen in FIG. 12, the third torque-transmitting profile 54 is disposed at least on the second hub-center facing side 34. The third torque-transmitting profile 54 is disposed around the second sprocket opening SP2C at least on the second hub-center facing side 34. The plurality of third torque-transmitting spline teeth 56 is disposed at least on the second hub-center facing side 34.

In this embodiment, the third torque-transmitting profile 54 extends from the second hub-center facing side 34 toward the second hub-center far side 36. The third torque-transmitting profile 54 is offset from the second hub-center far side 36 in the axial direction D3. However, the third torque-transmitting profile 54 can be disposed on the second hub-center far side 36. The third torque-transmitting profile 54 can be offset from the second hub-center facing side 34 in the axial direction D3.

The at least one additional torque-transmitting spline tooth 56 extends in the axial direction D3. The plurality of third torque-transmitting spline teeth 56 is disposed at least on the second hub-center facing side 34. The at least one additional torque-transmitting spline tooth 56 extends from the second hub-center facing side 34 toward the second hub-center far side 36 in the axial direction D3. The third torque-transmitting spline tooth 56 is offset from the first torque-transmitting spline tooth 42 in the axial direction D3 to be free of engagement with first torque-transmitting spline tooth 42 in the mounted state. However, one axial end of the additional torque-transmitting spline tooth 56 can be offset from the second hub-center facing side 34. The other axial end of the additional torque-transmitting spline tooth 56 can be provided on the second hub-center far side 36 in the axial direction D3.

The third torque-transmitting profile 54 includes a third axial end 54A disposed closer to the second hub-center facing side 34 than the second hub-center far side 36 in the axial direction D3. The third torque-transmitting profile 54 includes a third additional axial end 54B provided on a reverse side of the third axial end 54A in the axial direction D3. The third axial end 54A is provided between the third additional axial end 54B and the second hub-center far side 36 in the axial direction D3. The third torque-transmitting spline tooth 56 extends from the third axial end 54A to the third additional axial end 54B in the axial direction D3.

The at least one additional torque-transmitting spline tooth 56 has an additional axial spline length L3 defined in the axial direction D3. The additional axial spline length L3 is defined between the third axial end 54A and the third additional axial end 54B in the axial direction D3. In this embodiment, the third axial end 54A is offset from the second hub-center far side 36 toward the second hub-center facing side 34 in the axial direction D3. The third additional axial end 54B is provided on the second hub-center facing side 34. However, the axial positions of the third axial end 54A and the third additional axial end 54B are not limited to this embodiment. The third axial end 54A can be provided on the second hub-center far side 36. The third additional axial end 54B can be offset from the second hub-center facing side 34 toward the second hub-center far side 36 in the axial direction D3. The additional axial spline length L3 can also be referred to as a third axial spline length L3.

As seen in FIG. 9, the further additional torque-transmitting spline tooth 58 has a fourth axial spline length L4 defined in the axial direction D3. The fourth axial spline length L4 is equal to the axial spline length L2 of the at least one torque-transmitting spline tooth 52. However, the fourth axial spline length L4 can be different from the axial spline length L2 of the at least one torque-transmitting spline tooth 52. The further additional torque-transmitting spline tooth 58 has substantially the same structure as that of the second torque-transmitting spline tooth 52 except for a circumferential width of the further additional torque-transmitting spline tooth 58. Thus, it will not be described in detail here for the sake of brevity.

As seen in FIG. 12, the axial spline length L2 of the at least one torque-transmitting spline tooth 52 is different from the first axial spline length L1 of the at least one first torque-transmitting spline tooth 42. In this embodiment, the axial spline length L2 of the at least one torque-transmitting spline tooth 52 is larger than the first axial spline length L1 of the at least one first torque-transmitting spline tooth 42. However, the axial spline length L2 of the at least one torque-transmitting spline tooth 52 can be equal to or smaller than the first axial spline length L1 of the at least one first torque-transmitting spline tooth 42.

The axial spline length L2 of the at least one torque-transmitting spline tooth 52 is different from the additional axial spline length L3 of the at least one additional torque-transmitting spline tooth 56. In this embodiment, the axial spline length L2 of the at least one torque-transmitting spline tooth 52 is larger than the additional axial spline length L3 of the at least one additional torque-transmitting spline tooth 56. However, the axial spline length L2 of the at least one torque-transmitting spline tooth 52 can be equal to or smaller than the additional axial spline length L3 of the at least one additional torque-transmitting spline tooth 56.

The first axial spline length L1 of the at least one first torque-transmitting spline tooth 42 is different from the additional axial spline length L3 of the at least one additional torque-transmitting spline tooth 56. In this embodiment, the first axial spline length L1 of the at least one first torque-transmitting spline tooth 42 is smaller than the additional axial spline length L3 of the at least one additional torque-transmitting spline tooth 56. However, the first axial spline length L1 of the at least one first torque-transmitting spline tooth 42 can be equal to or larger than the additional axial spline length L3 of the at least one additional torque-transmitting spline tooth 56.

The axial spline length L2 of the at least one torque-transmitting spline tooth 52 is different from a total of first axial spline length L1 of the at least one first torque-transmitting spline tooth 42 and the additional axial spline length L3 of the at least one additional torque-transmitting spline tooth 56. In this embodiment, the axial spline length L2 of the at least one torque-transmitting spline tooth 52 is larger than the total of first axial spline length L1 of the at least one first torque-transmitting spline tooth 42 and the additional axial spline length L3 of the at least one additional torque-transmitting spline tooth 56. However, the axial spline length L2 of the at least one torque-transmitting spline tooth 52 can be equal to or smaller than the total of first axial spline length L1 of the at least one first torque-transmitting spline tooth 42 and the additional axial spline length L3 of the at least one additional torque-transmitting spline tooth 56.

As seen in FIG. 12, the first sprocket SP1 includes an axial abutment surface 60 configured to axially abut against the second sprocket SP2 for axially positioning the first sprocket SP1 and the second sprocket SP2 relative to each other in the mounted state. The second sprocket SP2 includes an additional axial abutment surface 62 configured to axially abut against the axial abutment surface 60 for axially positioning the first sprocket SP1 and the second sprocket SP2 relative to each other in the mounted state.

The axial abutment surface 60 is disposed farther from the axial center plane CP of the bicycle rear hub assembly 4 than the first torque-transmitting profile 40 in the mounted state. The axial abutment surface 60 is provided on the first hub-center facing side 24 of the first sprocket SP1. The additional axial abutment surface 62 is provided on the second hub-center far side 36 of the second sprocket SP2.

Figure 13:
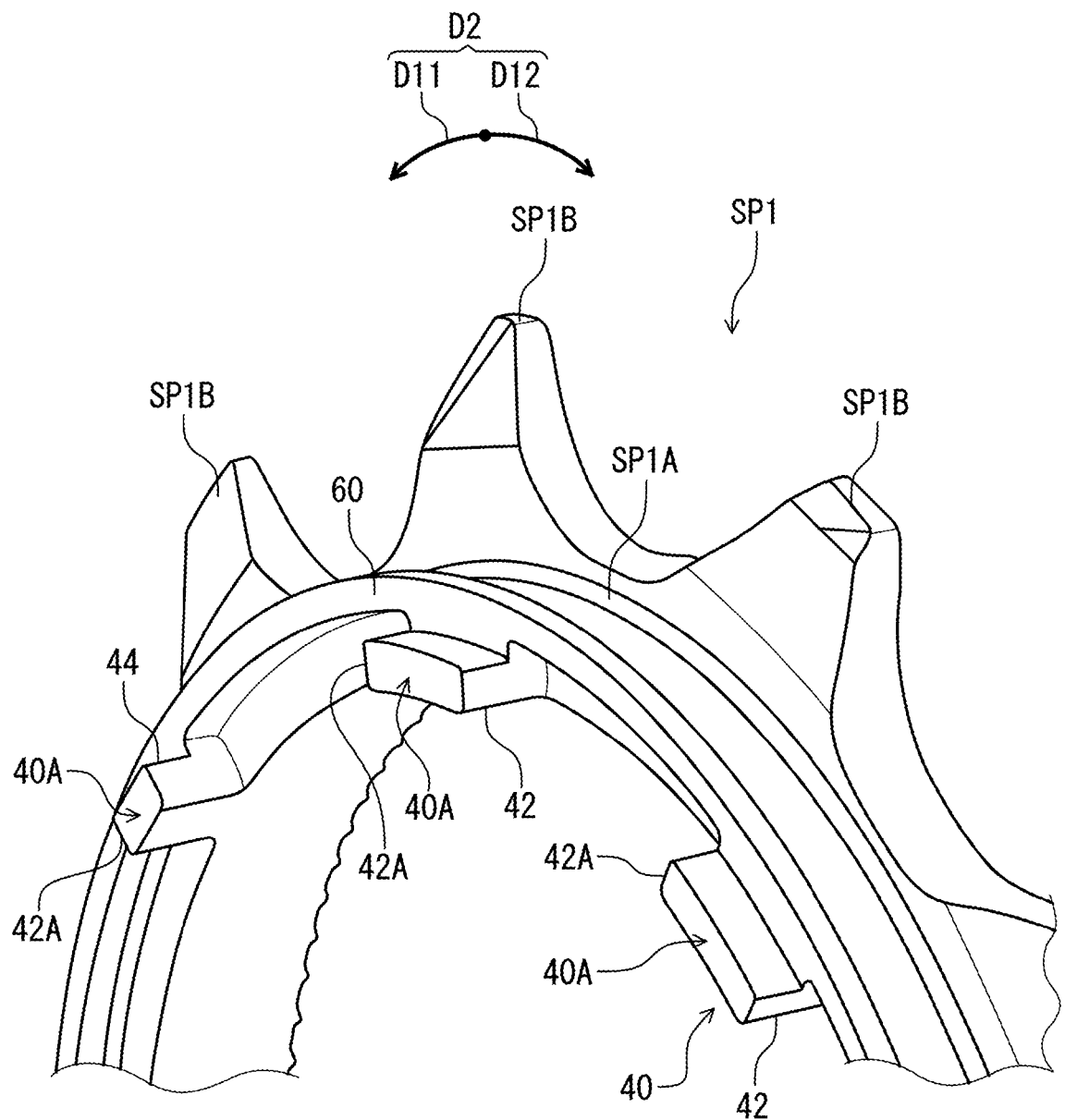
FIG. 13 is a partial perspective view of the first sprocket of the bicycle rear sprocket assembly illustrated in FIG. 1.

As seen in FIG. 13, the axial abutment surface 60 is adjacent to the first torque-transmitting profile 40 in the axial direction D3. The first torque-transmitting spline tooth 42 protrudes from the axial abutment surface 60 in the axial direction D3. However, the axial abutment surface 60 can be disposed closer to the axial center plane CP of the bicycle rear hub assembly 4 than the first torque-transmitting profile 40 in the mounted state. The positional relationship between the axial abutment surface 60 and the first torque-transmitting profile 40 is not limited to this embodiment.

Figure 14:
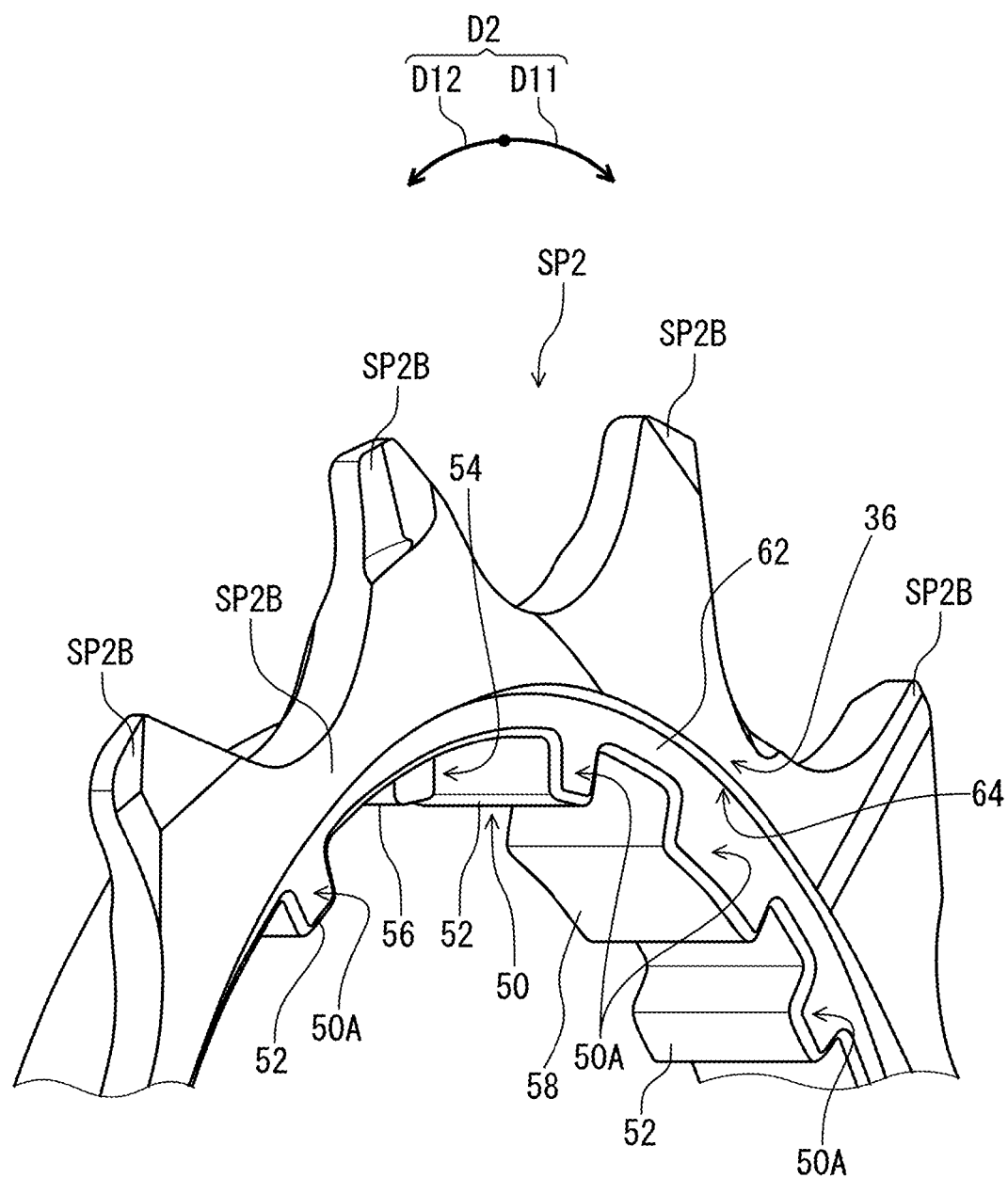
FIG. 14 is a partial perspective view of the second sprocket of the bicycle rear sprocket assembly illustrated in FIG. 1.

As seen in FIG. 14, the second sprocket SP2 includes a recess 64 provided on the second hub-center far side 36. The additional axial abutment surface 62 is provided in the recess 64. In this embodiment, an axial position of the additional axial abutment surface 62 coincides with an axial position of the second axial end 50A of the second torque-transmitting profile 50 in the axial direction D3. However, the axial position of the additional axial abutment surface 62 can be offset from the axial position of the second axial end 50A of the second torque-transmitting profile 50 in the axial direction D3.

As seen in FIG. 3, the axial abutment surface 60 is disposed radially outwardly from the first torque-transmitting profile 40. The axial abutment surface 60 is disposed radially outwardly from the plurality of first torque-transmitting spline teeth 42. The axial abutment surface 60 has an annular shape. However, the axial abutment surface 60 can have other shapes. The axial abutment surface 60 can be disposed radially inwardly from the first torque-transmitting profile 40 and/or disposed between the first torque-transmitting spline teeth 42 in the circumferential direction D2.

As seen in FIG. 5, the additional axial abutment surface 62 is disposed radially outwardly from the second torque-transmitting profile 50. The additional axial abutment surface 62 is disposed radially outwardly from the plurality of second torque-transmitting spline teeth 52, the plurality of third torque-transmitting spline teeth 56, and the fourth torque-transmitting spline tooth 58. The additional axial abutment surface 62 has an annular shape. However, the additional axial abutment surface 62 can have other shapes. The additional axial abutment surface 62 can be disposed radially inwardly from the second torque-transmitting profile 50 and/or disposed between the second torque-transmitting spline teeth 52 in the circumferential direction D2.

Figure 15:
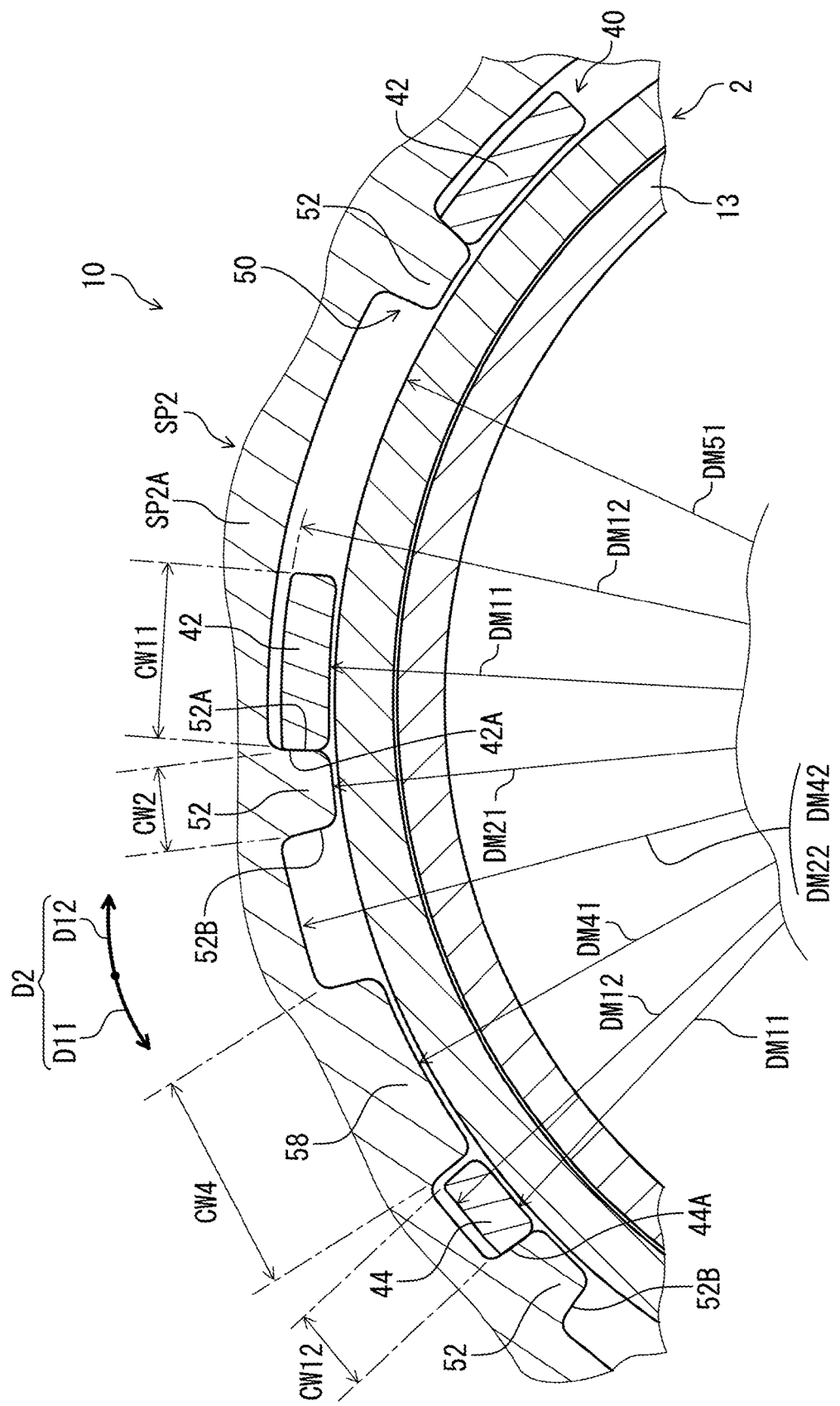
FIG. 15 is a partial enlarged cross-sectional view of the bicycle rear sprocket assembly.

As seen in FIG. 15, the plurality of the first torque-transmitting spline teeth 42 of the first sprocket SP1 has a first internal-spline minor diameter DM11 with respect to the rotational center axis μl. The first additional torque-transmitting spline tooth 44 has the first internal-spline minor diameter DM11 with respect to the rotational center axis μl. The plurality of the second torque-transmitting spline teeth 52 of the second sprocket SP2 has a second internal-spline minor diameter DM21 with respect to the rotational center axis μl. In this embodiment, a diameter difference defined by subtracting the second internal-spline minor diameter DM21 from the first internal-spline minor diameter DM11 is preferably equal to or larger than −2 mm. The diameter difference is more preferably equal to or larger than 0 mm. However, the diameter difference is not limited to the above ranges if needed and/or desired.

The plurality of the first torque-transmitting spline teeth 42 of the first sprocket SP1 has a first internal-spline major diameter DM12 with respect to the rotational center axis μl. The first additional torque-transmitting spline tooth 44 has the first internal-spline major diameter DM12 with respect to the rotational center axis μl. The plurality of the second torque-transmitting spline teeth 52 of the second sprocket SP2 has a second internal-spline major diameter DM22 with respect to the rotational center axis μl. The first internal-spline major diameter DM12 is smaller than the second internal-spline major diameter DM22.

Figure 16:
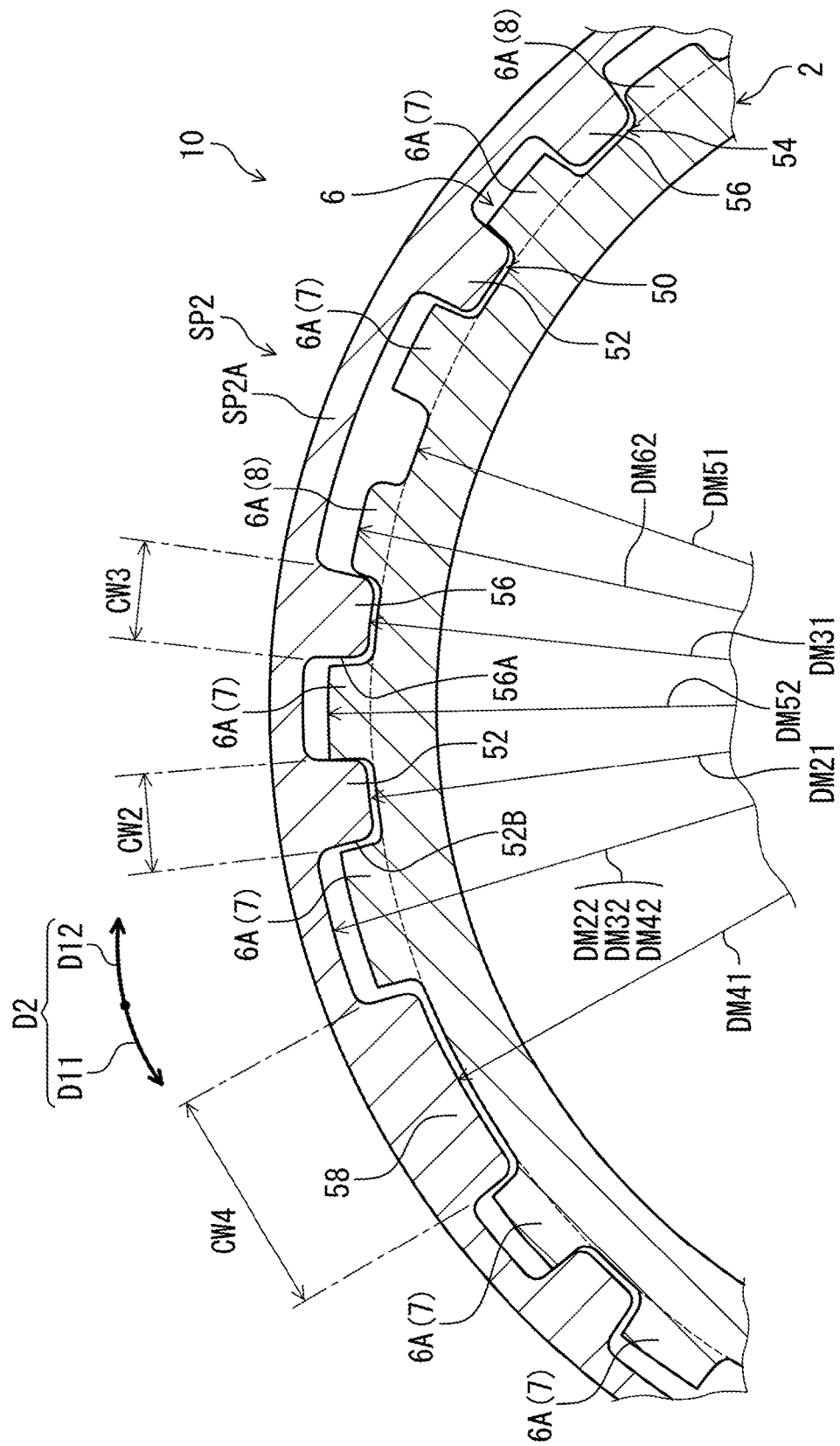
FIG. 16 is a partial enlarged cross-sectional view of the bicycle rear sprocket assembly.

As seen in FIG. 16, the plurality of the third torque-transmitting spline teeth 56 of the second sprocket SP2 has a third internal-spline minor diameter DM31 with respect to the rotational center axis μl. The plurality of the third torque-transmitting spline teeth 56 of the second sprocket SP2 has a third internal-spline major diameter DM32 with respect to the rotational center axis μl. The third internal-spline minor diameter DM31 is equal to the second internal-spline minor diameter DM21. The third internal-spline major diameter DM32 is equal to the second internal-spline major diameter DM22.

The further additional torque-transmitting spline tooth 58 of the second sprocket SP2 has a fourth internal-spline minor diameter DM41 with respect to the rotational center axis μl. The further additional torque-transmitting spline tooth 58 of the second sprocket SP2 has a fourth internal-spline major diameter DM42 with respect to the rotational center axis μl. The fourth internal-spline minor diameter DM41 is equal to the second internal-spline minor diameter DM21 and the third internal-spline minor diameter DM31. The fourth internal-spline major diameter DM42 is equal to the second internal-spline major diameter DM22 and the third internal-spline major diameter DM32.

Figure 17:
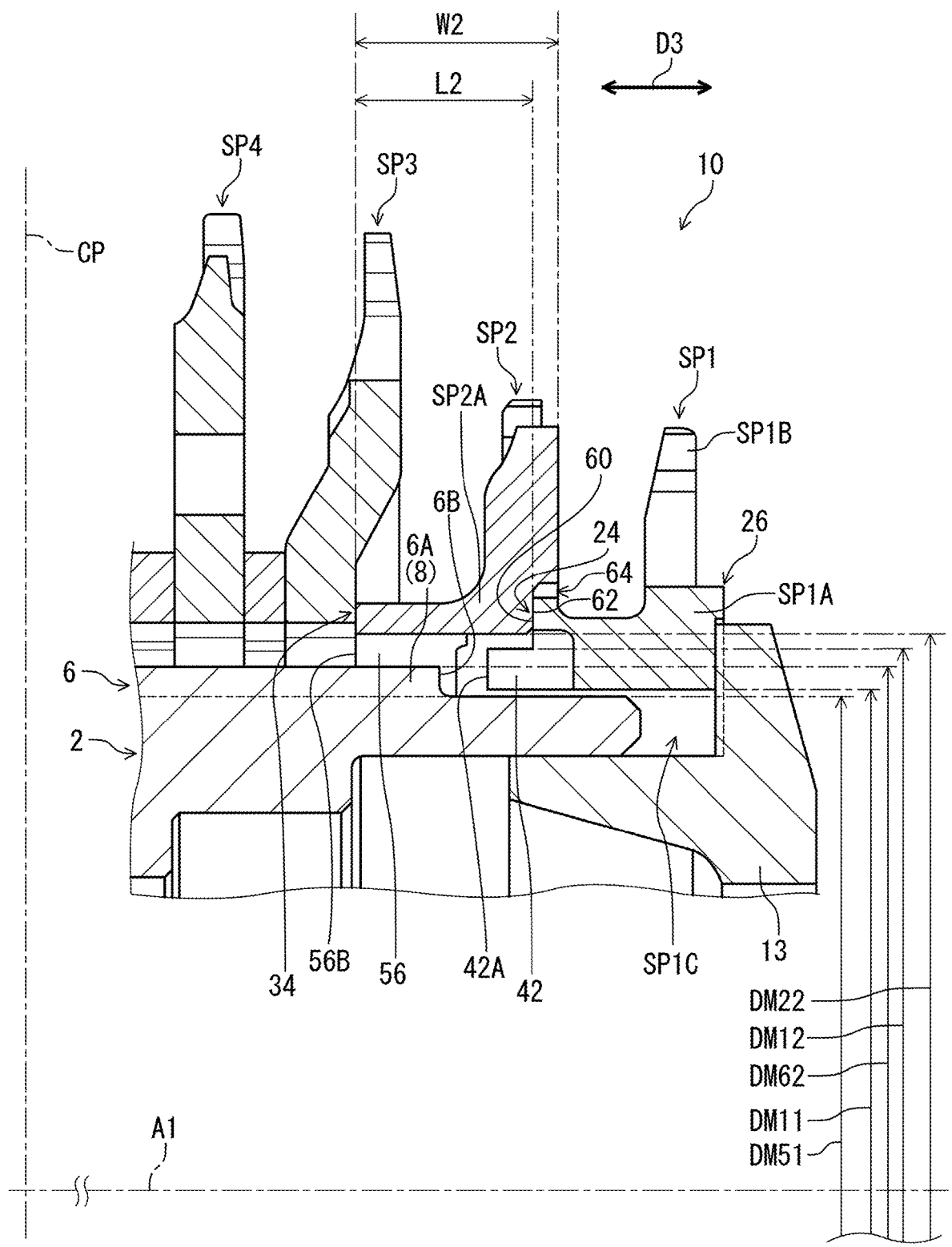
FIG. 17 is a cross-sectional view of the bicycle rear sprocket assembly taken along line XVII-XVII of FIG. 8.

As seen in FIGS. 10 and 17, the first internal-spline minor diameter DM11 is larger than an external spline minor diameter DM51 of the plurality of hub torque-transmitting spline teeth 6A of the sprocket support body 2 of the bicycle rear hub assembly 4. The first internal-spline major diameter DM12 is larger than an external spline major diameter DM52 and/or DM62 of the plurality of hub torque-transmitting spline teeth 6A of the sprocket support body 2 of the bicycle rear hub assembly 4.

As seen in FIG. 10, in this embodiment, the first external-spline tooth 7 includes a first tooth portion 7A and a second tooth portion 7B. The first tooth portion 7A has the external spline major diameter DM52. The second tooth portion 7B has an additional external spline major diameter DM53. The external spline major diameter DM52 is smaller than the additional external spline major diameter DM53. The first internal-spline major diameter DM12 is larger than the external spline major diameter DM52 of the plurality of first external-spline teeth 7. The first internal-spline major diameter DM12 is smaller than the additional external spline major diameter DM53. However, the relationship among the first internal-spline major diameter DM12, the external spline minor diameter DM51, the external spline major diameter DM52, and the additional external spline major diameter DM53 is not limited to this embodiment.

As seen in FIG. 17, the second external-spline tooth 8 has the external spline major diameter DM62. The first internal-spline major diameter DM12 is larger than the external spline major diameter DM62 of the plurality of second external-spline teeth 8. However, the relationship between the first internal-spline major diameter DM12 and the external spline major diameter DM62 is not limited to this embodiment.

As seen in FIG. 15, the first torque-transmitting spline tooth 42 has a first circumferential width CW11 defined in the circumferential direction D2. The first additional torque-transmitting spline tooth 44 has a first additional circumferential width CW12 defined in the circumferential direction D2. The second torque-transmitting spline tooth 52 has a second circumferential width CW2 defined in the circumferential direction D2. In this embodiment, the first circumferential width CW11 is larger than the first additional circumferential width CW12 and the second circumferential width CW2. However, the dimensional relationship between the first circumferential width CW11, the first additional circumferential width CW12, and the second circumferential width CW2 is not limited to this embodiment.

As seen in FIG. 16, the third torque-transmitting spline tooth 56 has a third circumferential width CW3 defined in the circumferential direction D2. The further additional torque-transmitting spline tooth 58 has a fourth circumferential width CW4 defined in the circumferential direction D2.

As seen in FIGS. 15 and 16, the second circumferential width CW2 is equal to the third circumferential width CW3. Thus, the first circumferential width CW11 is larger than the second circumferential width CW2 and the third circumferential width CW3. The fourth circumferential width CW4 is larger than the first circumferential width CW11, the second circumferential width CW2, and the third circumferential width CW3. However, the dimensional relationship among the first to fourth circumferential widths CW11 to CW4 is not limited to this embodiment.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rear sprocket assembly configured to be mounted to a sprocket support body of a bicycle rear hub assembly, the bicycle rear sprocket assembly comprising:
    a first sprocket having a first sprocket opening, a first hub-center facing side and a first hub-center far side provided on a reverse side of the first hub-center facing side in an axial direction with respect to a rotational center axis of the bicycle rear sprocket assembly, the first hub-center facing side being configured to face toward an axial center plane of the bicycle rear hub assembly in a mounted state where the bicycle rear sprocket assembly is mounted to the bicycle rear hub assembly, the first sprocket including a first torque-transmitting profile disposed around the first sprocket opening; and
    a second sprocket having a second sprocket opening, a second hub-center facing side and a second hub-center far side provided on a reverse side of the second hub-center facing side in the axial direction, the second hub-center facing side being configured to face toward the axial center plane of the bicycle rear hub assembly in the mounted state, the second sprocket including a second torque-transmitting profile disposed around the second sprocket opening, the second sprocket being configured to be disposed closer to the axial center plane of the bicycle rear hub assembly than the first sprocket in the mounted state,
    the first torque-transmitting profile of the first sprocket being configured to engage with the second torque-transmitting profile of the second sprocket to transmit a rotational force between the first torque-transmitting profile and the second torque-transmitting profile in the mounted state;
    the first sprocket including an axial abutment surface configured to axially abut against the second sprocket for axially positioning the first sprocket and the second sprocket relative to each other in the mounted state, and
    the axial abutment surface being disposed farther from the axial center plane of the bicycle rear hub assembly than the first torque-transmitting profile in the mounted state.

2. The bicycle rear sprocket assembly according to claim 1, wherein
    the axial abutment surface is adjacent to the first torque-transmitting profile in the axial direction.

3. The bicycle rear sprocket assembly according to claim 1, wherein
    the axial abutment surface is disposed radially outwardly from the first torque-transmitting profile.

4. The bicycle rear sprocket assembly according to claim 1, wherein
    the first torque-transmitting profile includes a first axial end disposed closer to the first hub-center facing side than to the first hub-center far side in the axial direction, and
    the second torque-transmitting profile includes a second axial end disposed closer to the second hub-center far side than to the second hub-center facing side in the axial direction.

5. The bicycle rear sprocket assembly according to claim 1, wherein
    a total tooth number of the first sprocket is smaller than a total tooth number of the second sprocket.

6. The bicycle rear sprocket assembly according to claim 5, wherein
    the total tooth number of the first sprocket is equal to or smaller than fourteen.

7. The bicycle rear sprocket assembly according to claim 1, wherein
    the first torque-transmitting profile includes a plurality of first torque-transmitting spline teeth, and
    the second torque-transmitting profile includes a plurality of second torque-transmitting spline teeth.

8. The bicycle rear sprocket assembly according to claim 1, wherein
    the second torque-transmitting profile of the second sprocket is configured to engage with a hub torque-transmitting profile of the sprocket support body in the mounted state.

9. The bicycle rear sprocket assembly according to claim 1, wherein
    the second sprocket includes a third torque-transmitting profile disposed around the second sprocket opening at least on the second hub-center facing side, and
    the third torque-transmitting profile of the second sprocket is configured to engage with a hub torque-transmitting profile of the sprocket support body in the mounted state.

10. The bicycle rear sprocket assembly according to claim 9, wherein
the third torque-transmitting profile is offset from the second torque-transmitting profile in a circumferential direction with respect to the rotational center axis.

11. The bicycle rear sprocket assembly according to claim 1, wherein
the first sprocket is configured to be disposed axially outwardly from the sprocket support body of the bicycle rear hub assembly with respect to the rotational center axis in the mounted state.

12. A bicycle rear sprocket assembly configured to be mounted to a sprocket support body of a bicycle rear hub assembly, the bicycle rear sprocket assembly comprising:
a first sprocket having a first sprocket opening, a first hub-center facing side and a first hub-center far side provided on a reverse side of the first hub-center facing side in an axial direction with respect to a rotational center axis of the bicycle rear sprocket assembly, the first hub-center facing side being configured to face toward an axial center plane of the bicycle rear hub assembly in a mounted state where the bicycle rear sprocket assembly is mounted to the bicycle rear hub assembly, the first sprocket including a first torque-transmitting profile disposed around the first sprocket opening at least on the first hub-center facing side; and
a second sprocket having a second sprocket opening, a second hub-center facing side and a second hub-center far side provided on a reverse side of the second hub-center facing side in the axial direction, the second hub-center facing side being configured to face toward the axial center plane of the bicycle rear hub assembly in the mounted state, the second sprocket including a second torque-transmitting profile disposed around the second sprocket opening so that the second torque-transmitting profile extends at least between the second hub-center facing side and the second hub-center far side, the second sprocket being configured to be disposed closer to the axial center plane of the bicycle rear hub assembly than the first sprocket in the mounted state,
the second torque-transmitting profile of the second sprocket being configured to engage with the first torque-transmitting profile of the first sprocket and a hub torque-transmitting profile of the sprocket support body in the mounted state, and
the second torque-transmitting profile of the second sprocket being configured to engage with the first torque-transmitting profile of the first sprocket in a circumferential direction with respect to the rotational center axis.

13. The bicycle rear sprocket assembly according to claim 12, wherein
the second torque-transmitting profile of the second sprocket is configured to engage with the first torque-transmitting profile of the first sprocket on the second hub-center far side in the mounted state and configured to engage with a hub torque-transmitting profile of the sprocket support body on the second hub-center facing side in the mounted state.

14. The bicycle rear sprocket assembly according to claim 12, wherein
the second torque-transmitting profile extends beyond a sprocket axial center plane of the second sprocket.

15. The bicycle rear sprocket assembly according to claim 12, wherein
the second torque-transmitting profile extends from the second hub-center facing side to the second hub-center far side.

16. A bicycle rear sprocket assembly configured to be mounted to a sprocket support body of a bicycle rear hub assembly, the bicycle rear sprocket assembly comprising:
a first sprocket having a first sprocket opening, a first hub-center facing side and a first hub-center far side provided on a reverse side of the first hub-center facing side in an axial direction with respect to a rotational center axis of the bicycle rear sprocket assembly, the first hub-center facing side being configured to face toward an axial center plane of the bicycle rear hub assembly in a mounted state where the bicycle rear sprocket assembly is mounted to the bicycle rear hub assembly, the first sprocket including a first torque-transmitting profile disposed around the first sprocket opening at least on the first hub-center facing side; and
a second sprocket having a second sprocket opening, a second hub-center facing side and a second hub-center far side provided on a reverse side of the second hub-center facing side in the axial direction, the second hub-center facing side being configured to face toward the axial center plane of the bicycle rear hub assembly in the mounted state, the second sprocket including a second torque-transmitting profile disposed around the second sprocket opening and a third torque-transmitting profile disposed around the second sprocket opening, the second sprocket being configured to be disposed closer to the axial center plane of the bicycle rear hub assembly than the first sprocket in the mounted state,
the second torque-transmitting profile of the second sprocket including at least one torque-transmitting spline tooth extending in the axial direction,
the third torque-transmitting profile of the second sprocket including at least one additional torque-transmitting spline tooth extending in the axial direction,
the at least one torque-transmitting spline tooth having an axial spline length defined in the axial direction,
the at least one additional torque-transmitting spline tooth having an additional axial spline length defined in the axial direction, and
the axial spline length of the at least one torque-transmitting spline tooth being different from the additional axial spline length of the at least one additional torque-transmitting spline tooth.

17. The bicycle rear sprocket assembly according to claim 16, wherein
the axial spline length of the at least one torque-transmitting spline tooth is larger than the additional axial spline length of the at least one additional torque-transmitting spline tooth.

18. The bicycle rear sprocket assembly according to claim 17, wherein
the at least one torque-transmitting spline tooth is configured to engage with the first torque-transmitting profile of the first sprocket and a hub torque-transmitting profile of the sprocket support body in the mounted state, and
the at least one additional torque-transmitting spline tooth is configured to be free of engagement with the first torque-transmitting profile of the first sprocket and to engage with the hub torque-transmitting profile of the sprocket support body in the mounted state.

19. The bicycle rear sprocket assembly according to claim 16, wherein the second torque-transmitting profile of the second sprocket includes a further additional torque-transmitting spline tooth that is different from the at least one torque-transmitting spline tooth and the at least one additional torque-transmitting spline tooth in at least one of size and shape.

20. A bicycle rear sprocket assembly configured to be mounted to a sprocket support body of a bicycle rear hub assembly, the bicycle rear sprocket assembly comprising:
a first sprocket having a first sprocket opening, a first hub-center facing side and a first hub-center far side provided on a reverse side of the first hub-center facing side in an axial direction with respect to a rotational center axis of the bicycle rear sprocket assembly, the first hub-center facing side being configured to face toward an axial center plane of the bicycle rear hub assembly in a mounted state where the bicycle rear sprocket assembly is mounted to the bicycle rear hub assembly, the first sprocket including a plurality of first torque-transmitting spline teeth disposed around the first sprocket opening; and
a second sprocket having a second sprocket opening, a second hub-center facing side and a second hub-center far side provided on a reverse side of the second hub-center facing side in the axial direction, the second hub-center facing side being configured to face toward the axial center plane of the bicycle rear hub assembly in the mounted state, the second sprocket including a plurality of second torque-transmitting spline teeth disposed around the second sprocket opening, the second sprocket being configured to be disposed closer to the axial center plane of the bicycle rear hub assembly than the first sprocket in the mounted state,
the plurality of the first torque-transmitting spline teeth of the first sprocket being configured to engage with the plurality of the second torque-transmitting spline teeth of the second sprocket in the mounted state,
the plurality of the first torque-transmitting spline teeth of the first sprocket having a first internal-spline minor diameter with respect to the rotational center axis,
the plurality of the second torque-transmitting spline teeth of the second sprocket having a second internal-spline minor diameter with respect to the rotational center axis, and
a diameter difference defined by subtracting the second internal-spline minor diameter from the first internal-spline minor diameter being a numerical value equal to or larger than −2 mm.

21. The bicycle rear sprocket assembly according to claim 20, wherein
the numerical value of the diameter difference is equal to or larger than 0 mm.

22. The bicycle rear sprocket assembly according to claim 20, wherein
the plurality of first torque-transmitting spline teeth is disposed at least on the first hub-center facing side, and
the plurality of second torque-transmitting spline teeth is disposed at least on the second hub-center far side.

23. A bicycle rear sprocket assembly configured to be mounted to a sprocket support body of a bicycle rear hub assembly, the bicycle rear sprocket assembly comprising:
a first sprocket having a first sprocket opening, a first hub-center facing side and a first hub-center far side provided on a reverse side of the first hub-center facing side in an axial direction with respect to a rotational center axis of the bicycle rear sprocket assembly, the first hub-center facing side being configured to face toward an axial center plane of the bicycle rear hub assembly in a mounted state where the bicycle rear sprocket assembly is mounted to the bicycle rear hub assembly, the first sprocket including a plurality of first torque-transmitting spline teeth disposed around the first sprocket opening, the first sprocket being configured to be disposed axially outwardly from the sprocket support body of the bicycle rear hub assembly with respect to the rotational center axis in the mounted state; and
a second sprocket having a second sprocket opening, a second hub-center facing side and a second hub-center far side provided on a reverse side of the second hub-center facing side in the axial direction, the second hub-center facing side being configured to face toward the axial center plane of the bicycle rear hub assembly in the mounted state, the second sprocket including a plurality of second torque-transmitting spline teeth disposed around the second sprocket opening, the second sprocket being configured to be disposed closer to the axial center plane of the bicycle rear hub assembly than the first sprocket in the mounted state,
the plurality of the first torque-transmitting spline teeth of the first sprocket being configured to engage with the plurality of the second torque-transmitting spline teeth of the second sprocket in the mounted state,
the plurality of the first torque-transmitting spline teeth of the first sprocket having a first internal-spline minor diameter with respect to the rotational center axis, and
the first internal-spline minor diameter being larger than an external spline minor diameter of a plurality of hub torque-transmitting spline teeth of the sprocket support body of the bicycle rear hub assembly.

24. The bicycle rear sprocket assembly according to claim 23, wherein
the plurality of the first torque-transmitting spline teeth of the first sprocket has a first internal-spline major diameter with respect to the rotational center axis, and
the first internal-spline major diameter is larger than an external spline major diameter of the plurality of hub torque-transmitting spline teeth of the sprocket support body of the bicycle rear hub assembly.

25. The bicycle rear sprocket assembly according to claim 23, wherein
the plurality of first torque-transmitting spline teeth is disposed at least on the first hub-center facing side, and
the plurality of second torque-transmitting spline teeth is disposed at least on the second hub-center far side.

\* \* \* \* \*